(12) United States Patent  (10) Patent No.: US 9,561,900 B2
Hansen  (45) Date of Patent: Feb. 7, 2017

(54) CARTRIDGE, A MACHINE, A SYSTEM AND A METHOD FOR THE PREPARATION OF BEVERAGES

(75) Inventor: Nick Hansen, Oxfordshire (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 755 days.

(21) Appl. No.: 13/345,509

(22) Filed: Jan. 6, 2012

(65) Prior Publication Data

US 2012/0177794 A1 Jul. 12, 2012

Related U.S. Application Data

(62) Division of application No. 11/572,617, filed as application No. PCT/US2005/026459 on Jul. 26, 2005, now Pat. No. 8,109,200.

(30) Foreign Application Priority Data

Jul. 27, 2004 (GB) .................................... 416705.2

(51) Int. Cl.
*B65D 85/804* (2006.01)
*A47J 31/06* (2006.01)
*A47J 31/44* (2006.01)

(52) U.S. Cl.
CPC ........ *B65D 85/8043* (2013.01); *A47J 31/0673* (2013.01); *A47J 31/4492* (2013.01); *B65D 2203/06* (2013.01); *B65D 2203/10* (2013.01)

(58) Field of Classification Search
CPC A47J 31/0652; A47J 31/0647; A47J 31/2621; A47J 31/007; A47J 31/40; A47J 31/4492; A47J 31/0673; A47J 31/00; A47J 31/002; A47J 31/06; A47J 31/0657; A47J 31/0668; A47J 31/24; A47J 31/34; A47J 31/36; A47J 31/3666; A47J 31/3676; B65D 85/08043; B65D 2203/06; B65D 2203/10; B65D 85/00; B65D 85/70; B65D 85/804; B65D 85/8043; B65D 85/8046; B65D 2203/00; A23F 5/00; A23F 5/24; A23F 5/243; A23F 5/26

(Continued)

(56) References Cited

U.S. PATENT DOCUMENTS 3,445,237 A 5/1969 Gidge
4,471,689 A 9/1984 Piana
(Continued)

FOREIGN PATENT DOCUMENTS

CN 1204995 A 1/1999
CN 1240337 A 1/2000
(Continued)

OTHER PUBLICATIONS

Communication from European Patent Office dated Jul. 20, 2007, in related EP Patent Application No. 05781266.1 (4 pages).

(Continued)

*Primary Examiner* — Erik Kashnikow
*Assistant Examiner* — Chaim Smith
(74) *Attorney, Agent, or Firm* — Fitch, Even, Tabin & Flannery LLP

(57) ABSTRACT

The invention provides a beverage preparation machine comprising a brew head for receiving beverage cartridges of various heights and means for passing an aqueous medium through said beverage cartridges to form a beverage from one or more beverage ingredients contained in said cartridges. The brew head comprising a first part and a second part, the first and second parts being movable relative to one another from an open position in which said beverage cartridges can be received in the brew head and a closed position in which said beverage cartridge can be fixedly (Continued)

retained in a brew head space defined between the first and second parts. Wherein in use, beverage cartridges of various heights may be clamped in the brew head space between a distal end of a clamping member and the second part.

16 Claims, 16 Drawing Sheets

(58) Field of Classification Search
USPC .......................................................... 426/433
See application file for complete search history.

(56) References Cited

U.S. PATENT DOCUMENTS

| | | | |
|---|---|---|---|
| 4,581,239 A * | 4/1986 | Woolman | A47J 31/002 426/431 |
| 4,886,674 A * | 12/1989 | Seward | B65D 85/8043 426/112 |
| 5,197,374 A | 3/1993 | Fond | |
| 5,242,702 A | 9/1993 | Fond | |
| 5,327,815 A | 7/1994 | Fond et al. | |
| 5,343,799 A | 9/1994 | Fond | |
| 5,347,916 A | 9/1994 | Fond et al. | |
| 5,398,595 A | 3/1995 | Fond et al. | |
| 5,637,335 A | 6/1997 | Fond et al. | |
| 5,656,311 A | 8/1997 | Fond | |
| 5,656,316 A | 8/1997 | Fond | |
| 5,897,899 A | 4/1999 | Fond | |
| 7,216,582 B2 | 5/2007 | Yoakim et al. | |
| 7,325,479 B2 | 2/2008 | Laigneau et al. | |
| 8,109,200 B2 | 2/2012 | Hansen | |
| 2002/0078831 A1 | 6/2002 | Cai | |
| 2003/0056661 A1* | 3/2003 | Hu et al. | 99/495 |
| 2003/0145736 A1 | 8/2003 | Green | |
| 2004/0137128 A1* | 7/2004 | Hayes | A47J 31/002 426/591 |
| 2004/0191370 A1* | 9/2004 | Halliday et al. | 426/112 |
| 2004/0228955 A1 | 11/2004 | Denisart et al. | |
| 2005/0016383 A1* | 1/2005 | Kirschner et al. | 99/279 |
| 2005/0183578 A1* | 8/2005 | Mandralis et al. | 99/279 |
| 2005/0188854 A1* | 9/2005 | Green et al. | 99/275 |
| 2005/0223904 A1 | 10/2005 | Laigneau et al. | |

FOREIGN PATENT DOCUMENTS

| | | |
|---|---|---|
| EP | 0398524 | 11/1990 |
| EP | 1042978 | 10/2000 |
| EP | 1440644 | 7/2004 |
| GB | 838829 | 6/1960 |
| JP | 2000355375 | 12/2000 |
| JP | 2001061663 | 3/2001 |
| WO | 9507648 | 3/1995 |
| WO | 02087400 | 7/2002 |
| WO | 03059778 | 7/2003 |
| WO | 2004006740 | 1/2004 |
| WO | 2004514488 | 5/2004 |
| WO | 2005072574 | 8/2005 |

OTHER PUBLICATIONS

Response to Communication from European Patent Office, Response dated Nov. 26, 2007, in related EP Patent Application No. 05781266.1 (15 pages).

Communication from European Patent Office of intent to grant a European Patent, in related EP Patent Application No. 05781266.1, Communication dated Feb. 20, 2008 (4 pages).

State Intellectual Property Office, People's Republic of China, First Office Action, issued Jun. 23, 2009, in related Chinese Patent Application No. 200580031674 (12 pages).

State intellectual Property Office Peeople's Republic of China, Second Office Action, issued Oct. 16, 2009, in related Chinese Patent Application No. 200580031674 (12 pages).

State Intellectual Property Office, People's Republic of China, Third Office Action, issued Feb. 12, 2010, in releated Chinese Patent Application No. 200580031674 (12 pages).

U.K. Patent Office, Combined Search and Examination Report issed Dec. 17, 2004, in related U.K. Patent Application No. GB0416705.2 (6 pages).

Response filed Jan. 6, 2005, in related U.K. Patent Application No. GB0416705.2 (2 pages).

U.K. Patent Office, Further Search Report of original claims 9-12 dated Mar. 18, 2005, in related U.K. Patent Application No. GB0416705.2 (3 pages).

U.K. Patent Office, Further Search Report of origial claims 21-27 dated Mar. 18, 2005, in related U.K. Patent Application No. GB0416705.2 (3 pages).

Response dated Aug. 9, 2007, in related U.K. Patent Application No. GB0416705.2 (1 page).

Examination Report dated Aug. 24, 2007, in related U.K. Patent Application No. GB0416705.2 (3 pages).

International Search Report and Written Opinion dated Mar. 10, 2006 from related International (PCT) Patent Application No. PCT/US2005/026459, (11 pages).

* cited by examiner

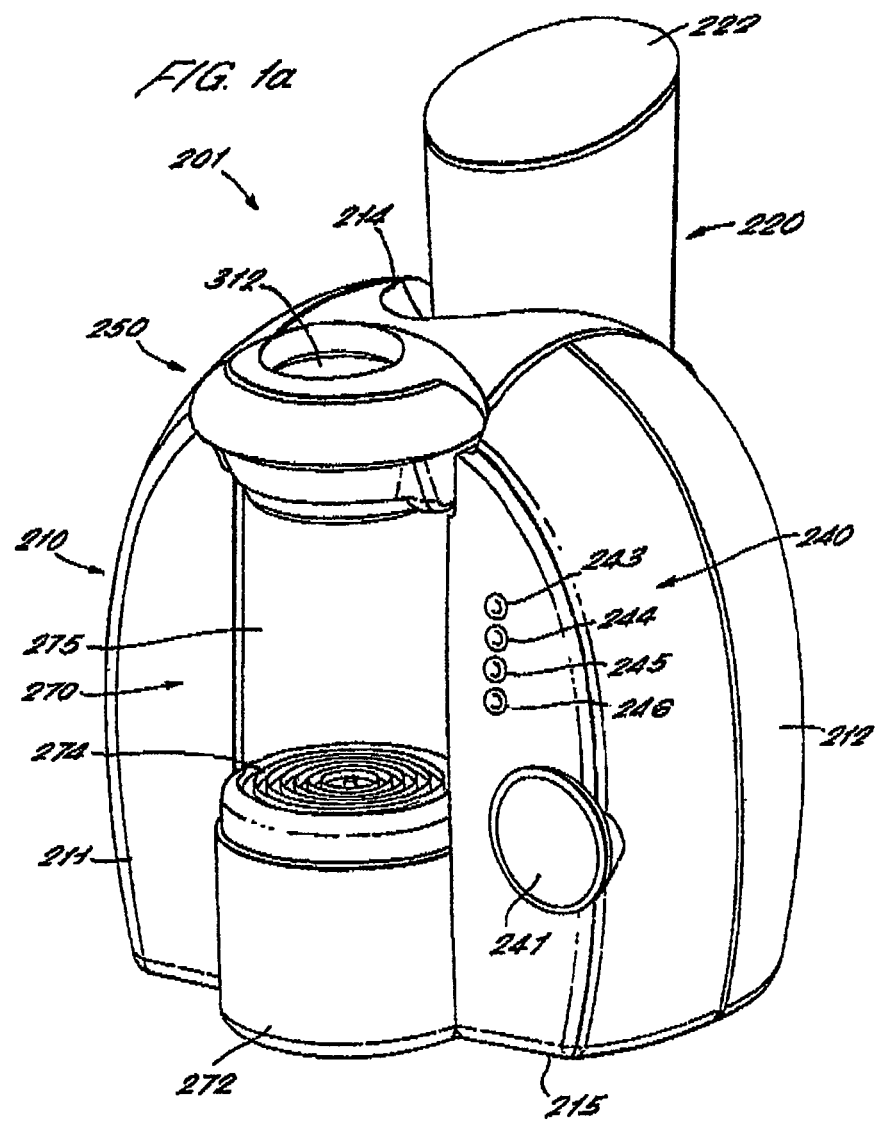

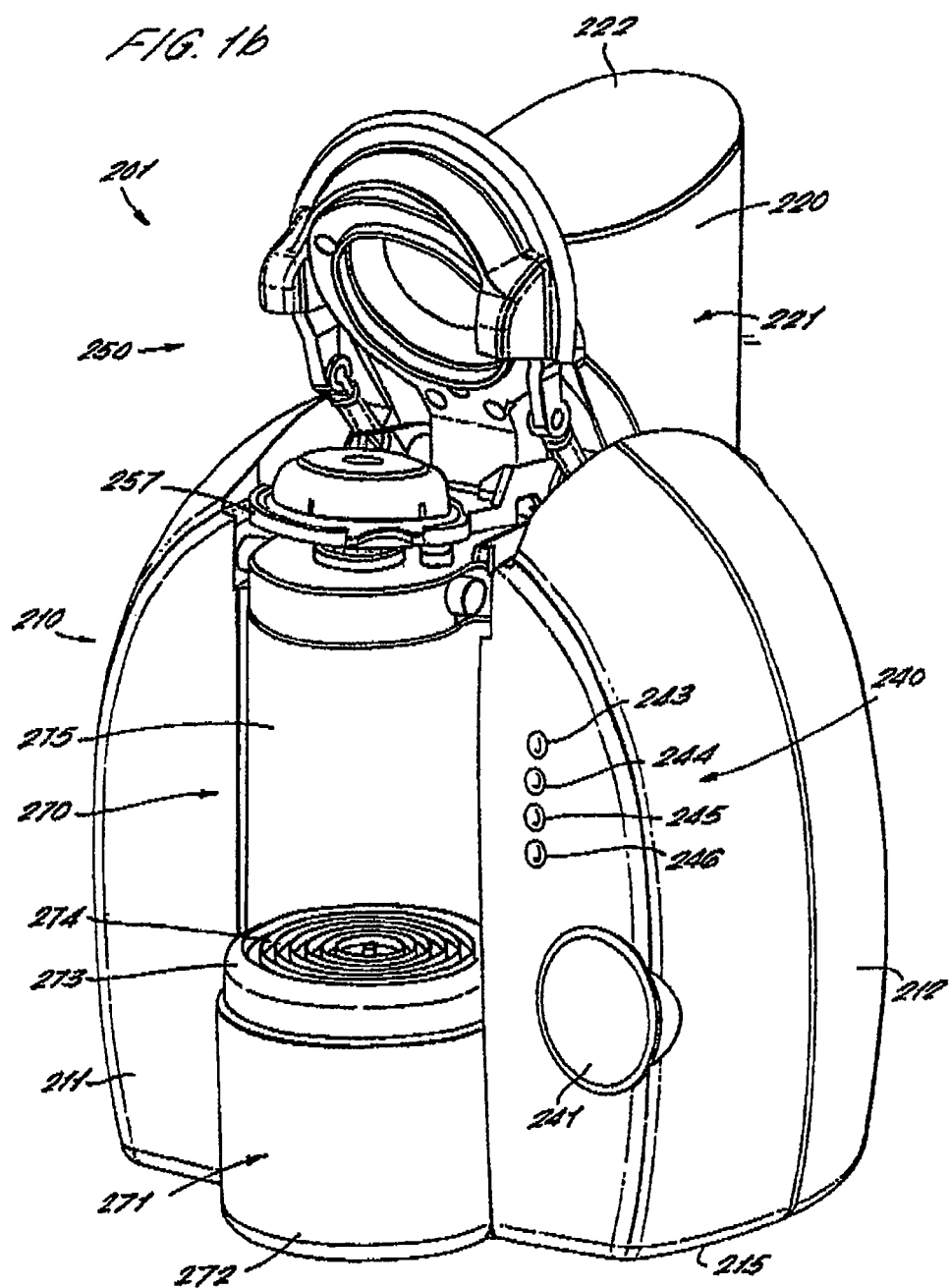

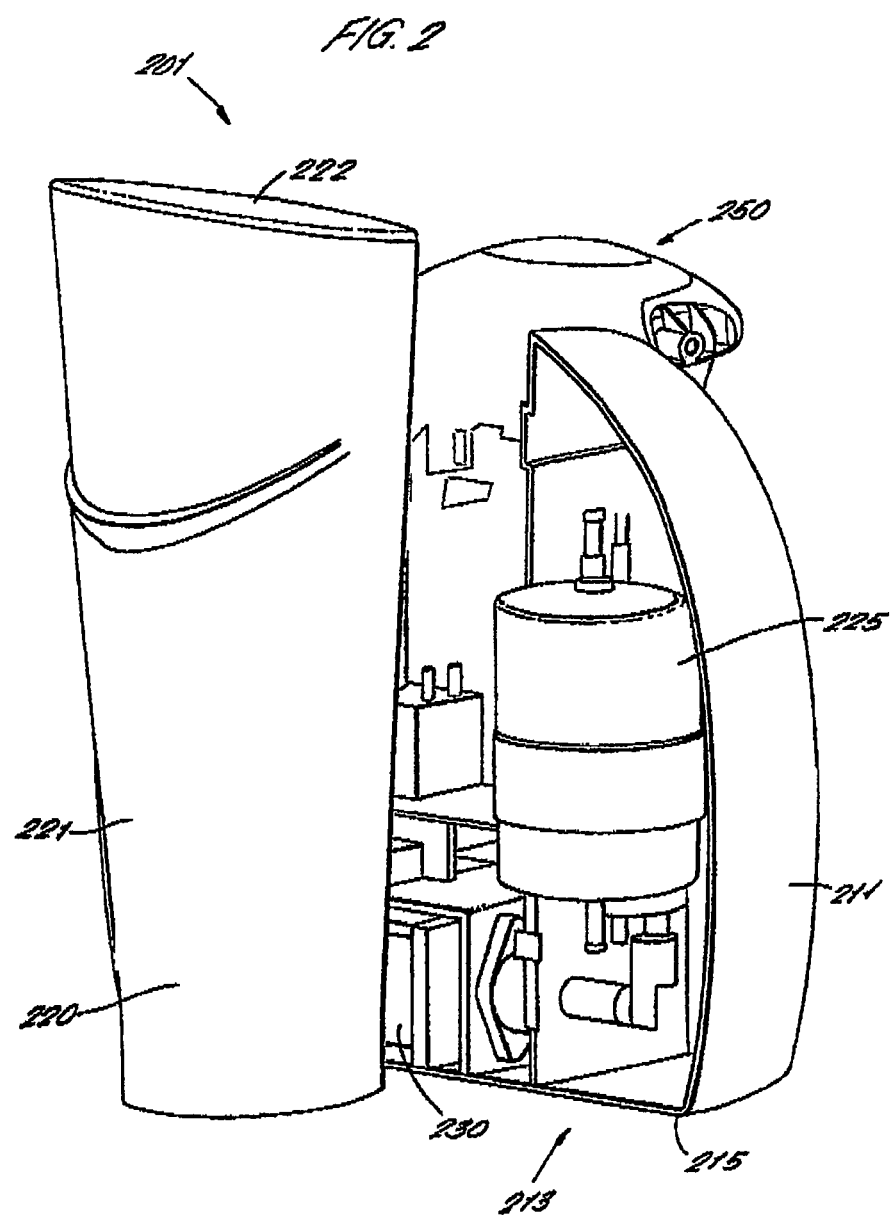

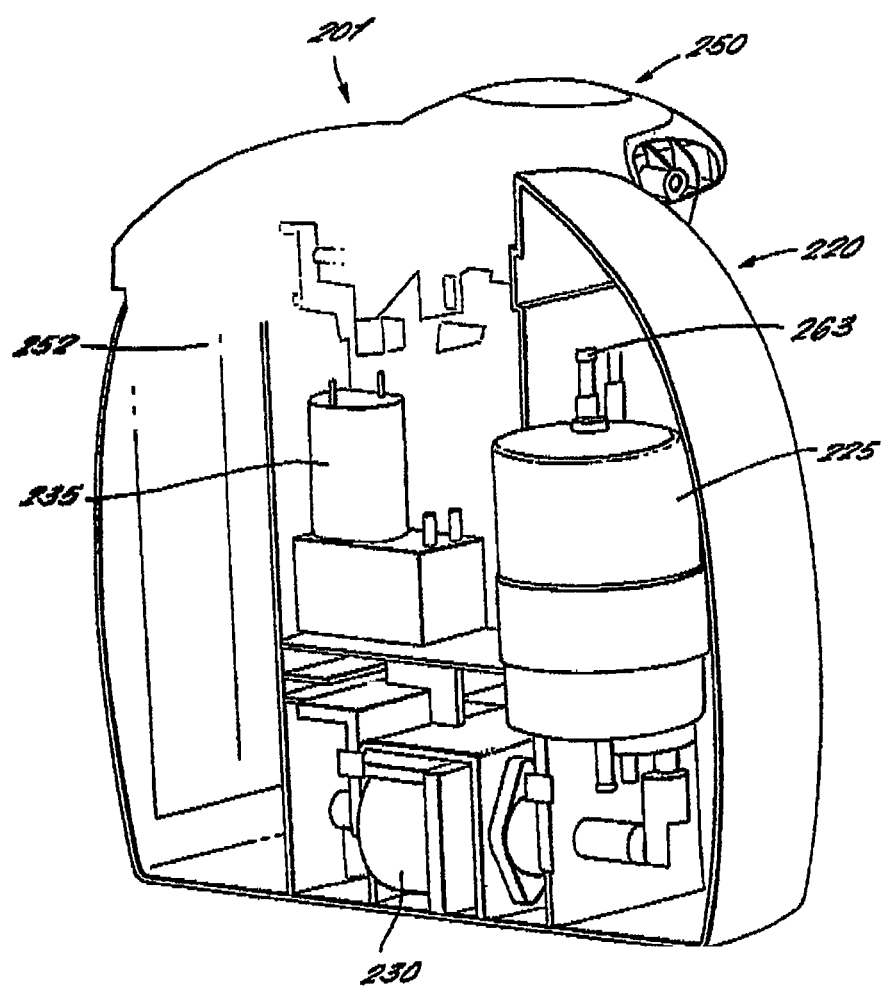

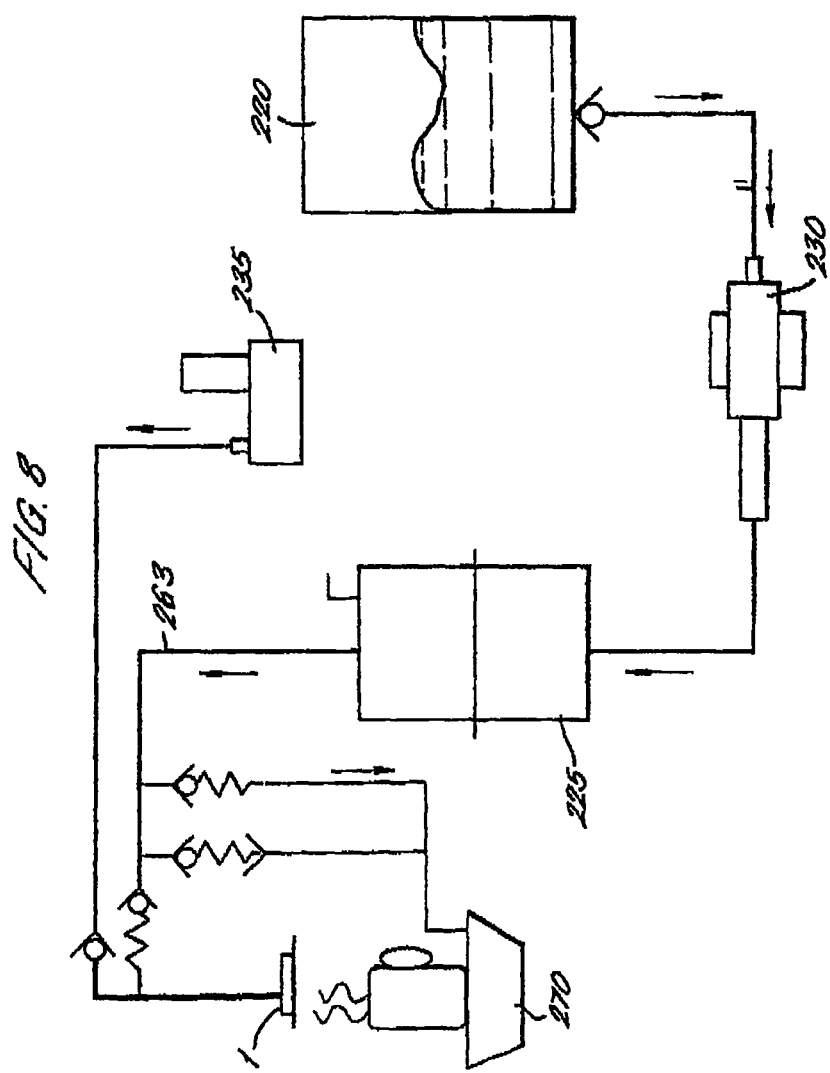

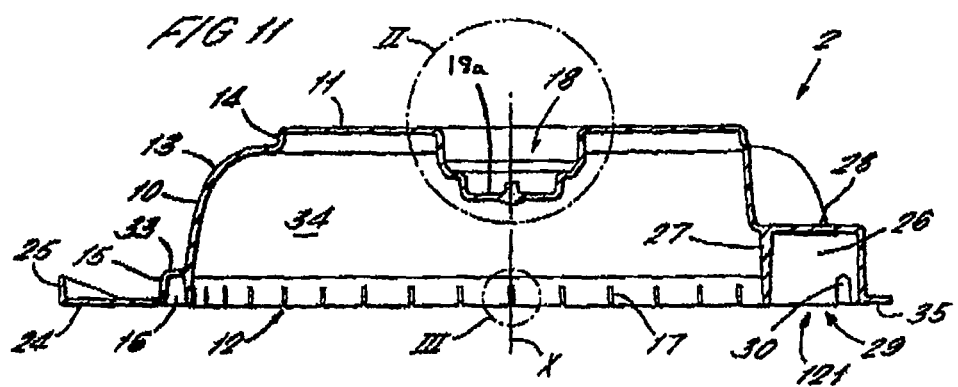
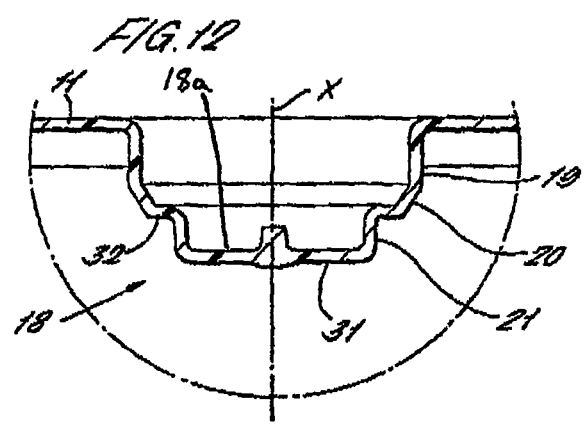

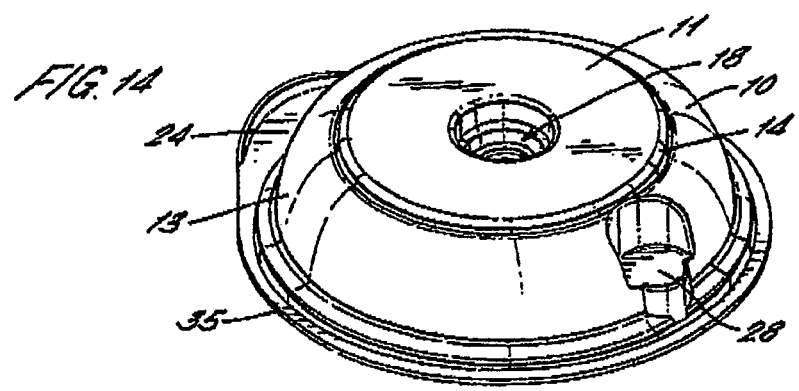
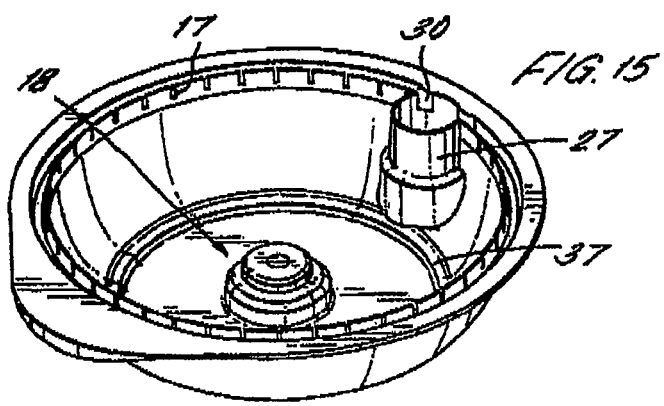
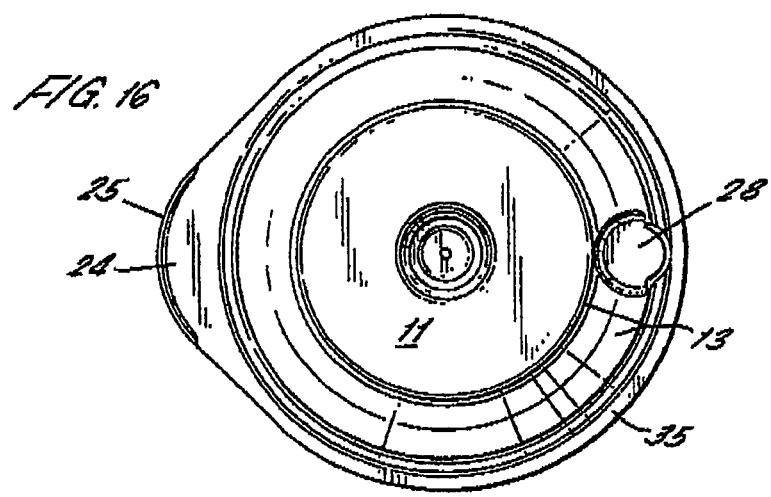

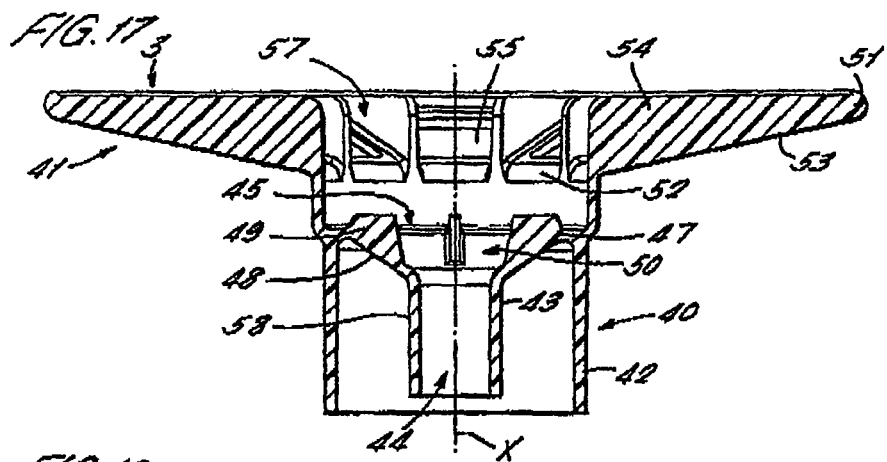
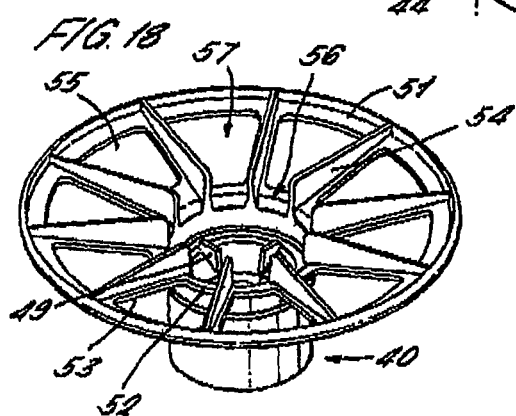
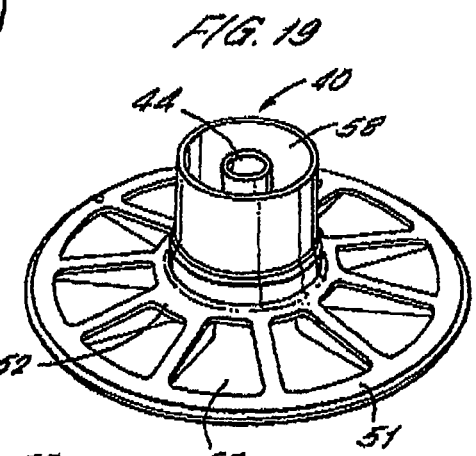
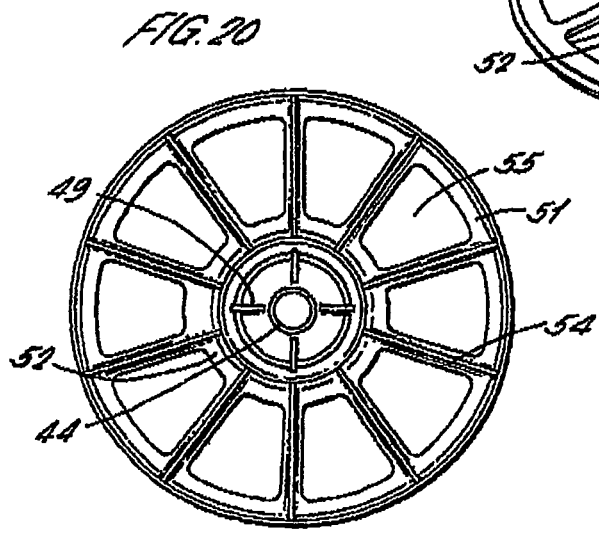

CARTRIDGE, A MACHINE, A SYSTEM AND A METHOD FOR THE PREPARATION OF BEVERAGES

CROSS-REFERENCE TO RELATED APPLICATIONS

This application is divisional application of U.S. patent application Ser. No. 11/572,617, filed Jan. 24, 2007, which is a national phase application of International Application No. PCT/US2005/026459, filed Jul. 26, 2005, claiming priority to United Kingdom Patent Application No. 416705.2, filed Jul. 27, 2004, which are all hereby incorporated by reference herein in their entirety.

The present invention relates to a cartridge, a machine and a system for the preparation of beverages.

BACKGROUND

It is known to provide machines and systems for the preparation of single servings of beverages such as coffee, tea and chocolate from cartridges contained a pre-measured quantity of one or more beverage ingredients. The strength of the beverage dispensed can be varied by diluting the ingredients or the brewed composition using a supply of water. However, with some beverages such as coffee there is a demand for stronger beverages and or larger quantities of beverage in a single serving. Attempts have been made to provide concentrated beverage ingredients, in granular or liquid form, to allow larger and or stronger beverages to be dispensed from a cartridge of fixed volume. However these attempts have generally not proved successful due in part to differences in taste between granular and liquid based, composition and compositions based on roasted and ground ingredients. Another solution is simply to use larger cartridges for larger volume beverages. However, this normally requires the use of a separate machine for each cartridge size or the utilization of complicated clamping mechanisms which can adopt separate modes for clamping different cartridges. This results in expensive arrangements which can be difficult to operate.

SUMMARY

According to the present invention there is provided a beverage preparation machine comprising a brew head for receiving beverage cartridges of various heights and means for passing an aqueous medium through said beverage cartridges to form a beverage from one or more beverage ingredients contained in said cartridges, the brew head comprising a first part and a second part, the first and second parts being movable relative to one another from en open position in which said beverage cartridges can be received in the brew head and a closed position in which said beverage cartridge can be fixedly retained in a brew head space defined between the first and second parts, the first part of the brew head comprising a clamping member which extends within the brew head space part-way towards the second part such that a distal end of the clamping member and the second part are a fixed distance from one another when the first and second parts are in the closed position, wherein in use, beverage cartridges of various heights may be clamped in the brew head space between the distal and of the clamping member and the second part.

Advantageously, the clamping arrangement of the present invention allows for a simplified arrangement which accommodates beverage cartridges of various sizes using a single mode of operation. This, results in a machine which is easier to operate. In addition the mechanism is inexpensive and not prone to breakdown since the mechanism does not need to be altered or adjusted to accommodate different sized cartridges. The use of a fixed distance between the clamping member and the second part results in a uniform compressive force being applied to the cartridges irrespective of their size. This improves the consistency of operation of the machine.

Preferably the clamping member is located at or near a centre of the first part so as to clamp a beverage cartridge received in the brew head at or near a centre thereof.

Preferably the clamping member comprises an extension which co-operates in use with a recess of the beverage cartridge.

The brew head space may have a volume of greater than 50 ml. The brew head space may have a height of between 15 and 30 mm.

In one aspect the clamping member extends towards the second part a distance between 50 and 70% of the height of the brew space. The clamping member may extend towards the second part a distance of approximately 60% of the height of the brew space.

In use, beverage cartridges of at least two heights may be clamped in the brew head space between the distal end of the clamping member and the second part.

The present invention also provides a beverage cartridge comprising a storage volume containing one or more beverage ingredients and comprising an outer surface having an elongated recess which extends towards an opposed surface of the cartridge a distance between 50 and 70% of the height of the beverage cartridge, the recess being suitable for receiving in use a clamping member of a beverage preparation machine, wherein the recess defines a clamping surface for said clamping member.

The storage volume for one or more beverage ingredients may be between 40 and 60 ml. In one aspect the storage volume for the one or more beverage ingredients is greater than or equal to 50 ml.

The height, of the cartridge may be greater than 25 mm.

The present invention further provides a beverage preparation system comprising a beverage preparation machine as described above and a plurality of beverage cartridges of various heights, wherein each of said beverage cartridges comprises a first clamping surface on a first side of the beverage cartridge and a second clamping surface on an opposed side of the beverage cartridge, wherein the first and second clamping surfaces of each of the beverage cartridges are separated by a uniform distance equal to or marginally greater than the distance between the clamping member and the second part of the beverage preparation machine when in a closed position.

Preferably each of the beverage cartridges comprises a recess on the first side thereof and the first clamping surface is provided at or near a bottom of said recess.

Preferably, with the first and second parts of the brew head in the closed position, the clamping member is extendable within the recess such that the distal end of the clamping member is contactable with the first clamping surface.

In one aspect the brew head space may be greater than 50 ml.

Preferably the beverage cartridges comprise cartridges of at least two heights which may be clamped in the brew head spice between the distal end of the clamping member and the second part.

In one aspect the beverage cartridges comprise a first cartridge type of a first height and storage volume and a second cartridge type of a second height and storage volume greater than the first cartridge type. Preferably the first cartridge type has a height of less than 18 mm and a storage volume of less than 35 ml. Preferably the second cartridge type has a height of greater than 25 mm and a storage volume of greater than or equal to 35 ml.

The present invention further provides a method of dispensing a single serving of a filtered beverage comprising the steps of:

providing a beverage cartridge containing one or more beverage ingredients suitable for brewing in a storage volume;

passing an aqueous medium through the one or more beverage ingredients to thereby form a filtered beverage;

dispensing said filtered beverage from the cartridge into a receptacle;

wherein the storage volume of the beverage cartridge is between 40 and 60 ml;

wherein the volume of the dispensed beverage is greater than 400 ml.

The volume of the dispensed beverage may be greater than 600 ml. The volume of the dispensed beverage may be greater than 700 ml. Preferably the beverage ingredient is roast and ground coffee. Also, instant coffee, instant tea or leaf tea may be used.

Optionally the method further comprises the steps of:

providing a second beverage cartridge containing one or more beverage ingredients suitable for foaming in a storage volume;

passing an aqueous medium through the one or more beverage ingredients to thereby form a foamed beverage portion;

dispensing said foamed beverage portion from the cartridge into a receptacle to thereby form a cappuccino-style beverage;

wherein the storage volume of the second beverage cartridge is between 40 and 60 ml; and wherein the volume of the dispensed foamed beverage portion is greater than 200 ml.

The volume of the dispensed foamed beverage portion may be greater than 300 ml. The foamable beverage ingredient may comprise a liquid milk or milk-based product or chocolate-based products.

In the following description the terms "upper" and "lower" and equivalents will be used to describe the relational positioning of features of the invention. The terms "upper" and "lower" and equivalents should be understood to refer to the cartridge (or other components) in its normal orientation for insertion into the beverage preparation machine and subsequent dispensing. In addition, the terms "inner" and "outer" and equivalents will be used to describe the relational positioning of features of the invention. The terms "inner" and "outer" and equivalents should be understood to refer to relative positions in the cartridge (or other components) being, respectively, nearer or further from a centre or major axis X of the cartridge (or other component).

BRIEF DESCRIPTION OF THE DRAWINGS

Embodiments of the present invention will now be described, by way of example only, with reference to the accompanying drawings, in which:

FIG. 1a is a front perspective view of a beverage preparation machine of the present invention;

FIG. 1b is a front perspective view of the machine of FIG. 1a with a brew head in an open position;

FIG. 2 is a rear perspective view of the machine of FIG. 1a with some parts omitted for clarity;

FIG. 3 is another rear perspective view of the machine of FIG. 1a With some parts omitted for clarity;

FIG. 8 is a schematic layout of the machine of FIG. 1a;

FIGS. 9a and 9b are schematic layouts of first and second code recognition means for the machine of FIG. 1a.

FIG. 11 is cross-sectional drawing of an cuter member of a first embodiment of cartridge of the present invention which may be used in the beverage preparation machine of the present invention;

FIG. 12 is a cross-sectional drawing of a detail of the outer member of FIG. 11 showing an inwardly directed cylindrical extension;

FIG. 13 is a cross-sectional drawing of a detail of the outer member of FIG. 11 showing a slot;

FIG. 14 is a perspective view from above of the outer member of FIG. 11;

FIG. 15 is a perspective view from above of the outer member of FIG. 11 in at inverted orientation;

FIG. 16 is a plan view from above of the outer member of FIG. 11;

FIG. 17 is a cross-sectional drawing of an inner member of the cartridge;

FIG. 18 is a perspective view from above of the inner member of FIG. 17;

FIG. 19 is a perspective view from above of the inner member of FIG. 17 in an inverted orientation;

FIG. 20 is a plan view from above of the inner member of FIG. 17;

DETAILED DESCRIPTION

Beverage Preparation System

Figure 4:
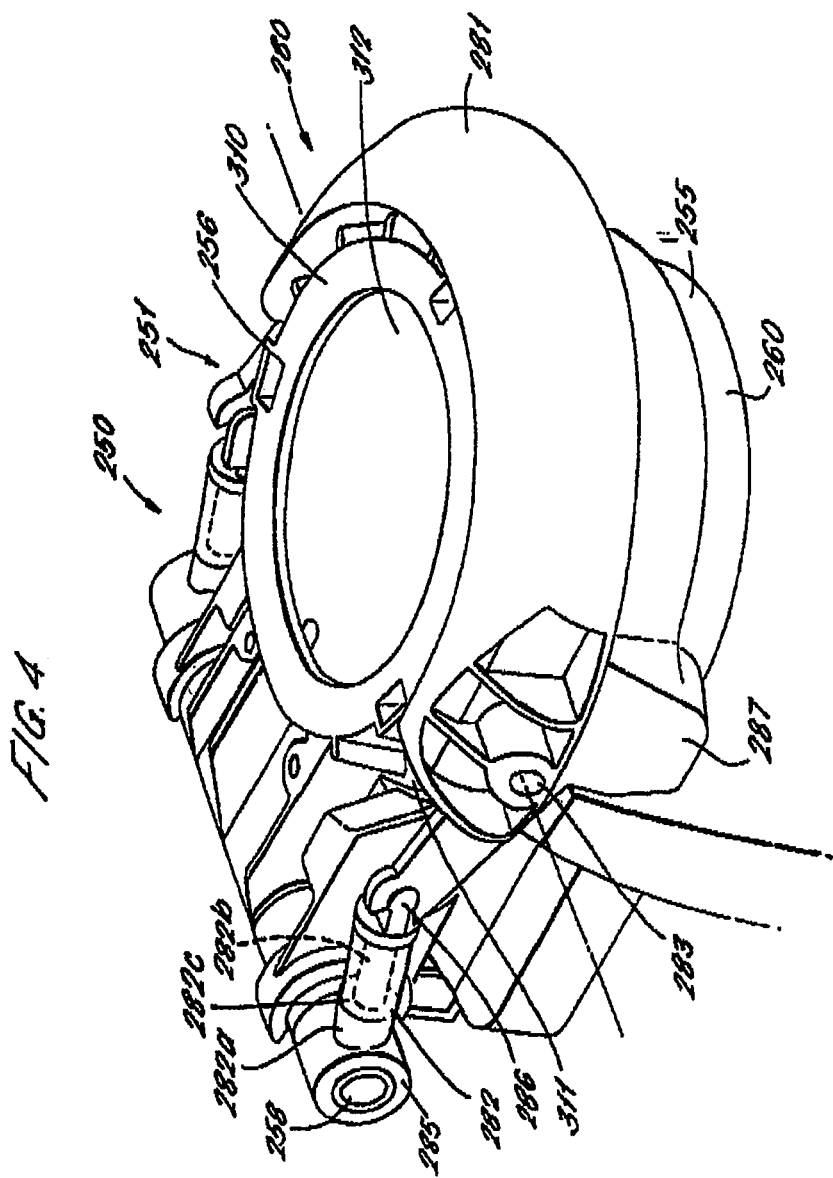
FIG. 4 is a perspective view of the brew head of the machine of FIG. 1a with some parts omitted for clarity.
Figure 5:
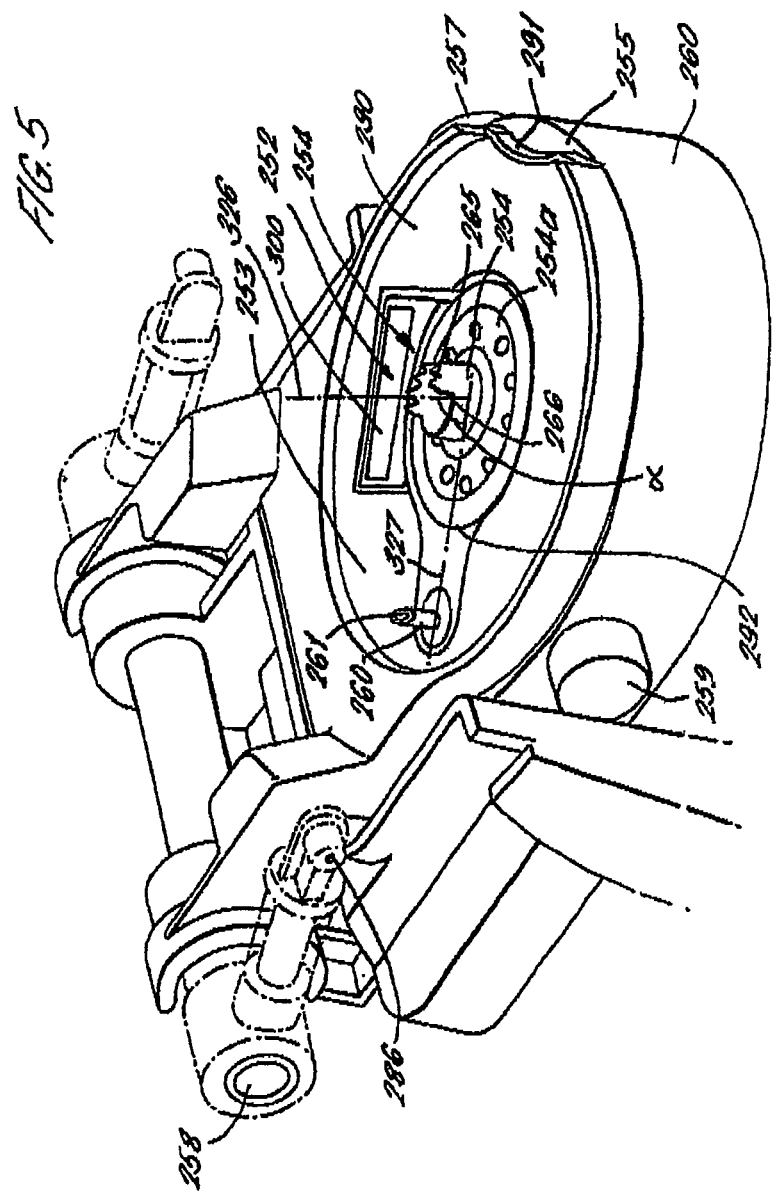
FIG. 5 is another perspective view of the brew head of the machine of FIG. 1a with seine parts omitted for clarity.

A beverage preparation machine 201 of the beverage preparation system of the present invention is shown in FIGS. 1a to 9b. The beverage preparation machine 201 generally comprises a housing 210 containing a water tank 220, a water heater 225, a water pump 230, an air compressor 235, a control processor, a user interface 240 and a brew head 250. The brew head 250 in turn generally comprises a holder 251, recognition means 252 and inlet and outlet piercers 253, 254.

The beverage preparation machine 201 is designed to be capable of dispensing beverage ingredients from inserts in the form of cartridges 1 such as that illustrated in FIGS. 10 to 22.

Cartridges for Use in the System

FIGS. 10 to 21 illustrate a first embodiment of the cartridge 1. The cartridge 1 generally comprises an outer member 2, an inner member 3 and a laminate 5. The outer member 2, inner member 3 and laminate 5 are assembled to form the cartridge 1 which has an interior 120 for containing one or more beverage ingredients, an inlet 121, an outlet 122 and a beverage flow path linking the inlet 121 to the outlet 122 and which passes through the interior 120. The inlet 121 and outlet 122 are initially sealed by the laminate 5 and are opened in use by piercing or cutting of the laminate 5. The beverage flow path is defined by spatial inter-relationships between the outer member 2, inner member 3 and laminate 5 as discussed below. Other components may optionally be included in the cartridge 1, such as a filter 4, as will be described further below.

The cartridge 1 is particularly designed for use in dispensing filtered products such as roast and ground coffee or leaf tea. However, the cartridge 1 may be used with other products such as chocolate, coffee, tea, sweeteners, cordials, flavorings, alcoholic beverages, flavored milk, fruit juices, squashes, sauces and desserts.

As can be seen from FIG. 15, the overall shape of the cartridge 1 is generally circular or disc-shaped with the diameter of the cartridge 1 being significantly greater than its height. A major axis X passes through the centre of the outer member as shown in FIG. 11. Typically the overall diameter of the outer member 2 is 68.5 mm±6 mm and the overall height is 16 mm±3 mm. Typically the volume of the cartridge 1 when assembled is 30.2 ml±20%.

The outer member 2 generally comprises a bowl-shaped shell 10 having a curved annular wall 13, a closed top 11 and an open bottom 12. The diameter of the outer member 2 is smaller at the top 11 compared to the diameter at the bottom 12, resulting from a flaring of the annular wall 13 as one traverses from the closed top 11 to the open bottom 12. The annular wall 13 and closed bottom 11 together define a receptacle having an interior 34.

A hollow inwardly directed cylindrical extension 18 is provided in the closed top 11 centered on the major axis X. As more clearly shown in FIG. 12, the interior surface of the cylindrical extension 18 comprises a stepped profile having first, second and third portions 19, 20 and 21. The first portion 19 is right circular cylindrical. The second portion 20 is frusto-conical in shape and is inwardly tapered. The third portion 21 is another right circular cylinder and is closed off by a lower face 31. The diameter of the first, second and third portion 19, 20 and 21 incrementally decreases such that the diameter of the cylindrical extension 18 decreases as one traverses from the top 11 to the closed lower face 31 of the cylindrical extension 18. A generally horizontal shoulder 32 is formed on the cylindrical extension 18 at the junction between the second and third portions 20 and 21. From the outside, the cylindrical extension 18 forms a recess in the outer surface of the cartridge. A clamping surface 18a is provided by the bottom of the recess as shown in FIG. 12. The use of the clamping surface 18a will be described below.

An outwardly extending shoulder 33 is formed in the outer member 2 towards the bottom 12. The outwardly extending shoulder 33 forms a secondary wall 15 co-axial with the annular wall 13 so as to define an annular track forming a manifold 16 between the secondary wall 15 and the annular wall 13. The manifold 16 passes around the circumference of the outer member 2. A series of slots 17 are provided in the annular wall 13 level with the manifold 16 to provide gas and liquid communication between the manifold 16 and the interior 34 of the outer member 2. As shown in FIG. 13, the slots 17 comprise vertical slits in the annular wall 13. Between 20 and 40 slots are provided. In the embodiment shown thirty-seven slots 17 are provided generally equi-spaced around the circumference of the manifold 16. The slots 17 are preferably between 1.4 and 1.8 mm in length. Typically the length of each slot is 1.6 mm representing 10% of the overall height of the outer member 2. The width of each slot is between 0.25 and 0.35 mm. Typically, the width of each slot is 0.3 mm. The width of the slots 17 is sufficiently narrow to prevent the beverage ingredients passing therethrough into the manifold 16 either during storage or in use.

An inlet chamber 26 is formed in the outer member 2 at the periphery of the outer member 2. A cylindrical wall 27 is provided, as most clearly shown in FIG. 15, which defines the inlet chamber 26 within, and partitions the inlet chamber 26 from, the interior 34 of the outer member 2. The cylindrical wall 27 has a closed upper face 28 which is formed on a plane perpendicular to the major axis X and an open lower end 29 co-planar with the bottom 12 of the outer member 2. The inlet chamber 26 communicates with the manifold 16 via two slots 30 as shown in FIG. 11. Alternatively, between one and four slots may be used to communicate between the manifold 16 and the inlet chamber 26.

A lower end of the outwardly extending shoulder 33 is provided with an outwardly extending flange 3S which extends perpendicularly to the major axis X. Typically the flange 35 has a width of between 2 and 4 mm. A portion of the flange 35 is enlarged to form a handle 24 by which the outer member 2 may be held. The handle 24 is provided with an upturned rim 25 to improve grip.

The outer member 2 is formed as a single integral piece from high density polyethylene, polypropylene, polystyrene, polyester, or a laminate of two or more of these materials. A suitable polypropylene is the range of polymers available from DSM UK Limited (Redditch, United Kingdom). The outer member may, be opaque, transparent or translucent. The manufacturing process may be injection molding.

The inner member 3 as shown in FIGS. 17 to 20, comprises an annular frame 41 and a downwardly extending cylindrical funnel 40. A major axis X passes through the centre of the inner member 3 as shown in FIG. 17.

As best shown in FIG. 18, the annular frame 41 comprises an outer rim 51 and an inner hub 52 joined by ten equi-spaced radial spokes 53. The inner hub 52 is integral with and extends from the cylindrical funnel 40. Filtration apertures 55 are formed in the annular frame 41 between the radial spokes 53. A filter 4 is disposed on the annular frame 41 so as to cover the filtration apertures 55. The filter is preferably made from a material with a high wet strength, for example a non-woven fiber material of polyester. Other materials which may be used include a water-impermeable cellulosic material, such as a cellulosic material comprising woven paper fibers. The woven paper fibers may be admixed with fibers of polypropylene, polyvinyl chloride and/or polyethylene. The incorporation of these plastic materials into the cellulosic material renders the cellulosic material heat-sealable. The filter 4 may also be treated or coated with a material which is activated by heat and/or pressure so that it can be sealed to the annular frame 41 in this way.

As shown in the cross-sectional profile of FIG. 17, the inner hub 52 is located at a lower position than the outer rim 51, resulting in the annular frame 41 having a sloping lower profile.

The upper surface of each spoke 53 is provided with an upstanding web 54 which divides a void space above the annular frame 41 into a plurality of passages 57. Each passage 57 is bounded on either side by a web 54 and on a lower face by the filter 4. The passages 57 extend from the outer rim 51 downwardly towards, and open into, the cylindrical funnel 40 at openings 56 defined by the inner extremities of the webs 54.

The cylindrical funnel 40 comprises an outer tube 42 surrounding an inner discharge spout 43. The outer tube 42 forms the exterior of the cylindrical funnel 40. The discharge spout 43 is joined to the outer tube 42 at an upper end of the discharge spout 43 by means of an annular flange 47. The discharge spout 43 comprises an inlet 45 at an upper end which communicates with the openings 56 of the passages 57 and an outlet 44 at a lower end through which the prepared beverage is discharged into a cup or other receptacle. The discharge spout 43 comprises a frusto-conical portion 48 at an upper end and a cylindrical portion 58 at a lower end. The cylindrical portion 58 may have a slight taper such that it narrows towards the outlet 44. The frusto-conical portion 48 helps to channel beverage from the passages 57 down towards the outlet 44 without inducing turbulence to the beverage. An upper surface of the frusto-conical portion 48 is provided with four support webs 49 equi-spaced around the circumference of the cylindrical funnel 40. The support webs 49 define channels 50 therebetween. The upper edges of the support webs 49 are level with one another and perpendicular to the major axis X.

The inner member 3 may be formed as a single integral piece from polypropylene or a similar material as described above and by injection molding in the same manner as the outer member 2.

Alternatively, the inner member 3 and/or the outer member 2 may be made from a biodegradable polymer. Examples of suitable materials include degradable polyethylene (for example, SPITEK supplied by Symphony Environmental, Borehamwood, United Kingdom), biodegradable polyester amide (for example, BAK 1095 supplied by Symphony Environmental), poly lactic acids (PLA supplied by Cargil, Minnesota, USA), starch-based polymers, cellulose derivatives and polypeptides.

The laminate 5 is formed from two layers, a first layer of aluminum and a second layer of cast polypropylene. The aluminum layer is between 0.02 and 0.07 mm in thickness. The cast polypropylene layer is between 0.025 and 0.065 mm in thickness. In one embodiment the aluminum layer is 0.06 mm and the polypropylene layer is 0.025 mm thick. This laminate is particularly advantageous as it has a high resistance to curling during assembly. As a result the laminate 5 may be pre-cut to the correct size and shape and subsequently transferred to the assembly station on the production line without undergoing distortion. Consequently, the laminate 5 is particularly well suited to welding. Other laminate materials may be used including PET/Aluminum/PP. PE/EVOH/PP, PET/metalized/PP and Aluminum/PP laminates. Poll laminate stock may be used instead of die cut stock.

The cartridge 1 may be closed by a rigid or semi-rigid lid instead of a flexible laminate.

Assembly of the cartridge 1 involves the following steps:
a) the inner member 3 is inserted into the outer member 2;
b) the filter 4 is cut to shape and placed onto the inner member 3 so to be received over the cylindrical funnel 40 and come to rest against the annular frame 41;
c) the inner member 3, outer member 2 and filter 4 are joined by ultrasonic welding;
d) the cartridge 1 is filled with one or more beverage ingredients;
e) the laminate 5 is affixed to the outer member 2.
These steps will be discussed in greater detail below.

The outer member 2 is orientated with the open bottom 12 directed upwards. The inner member 3 is then inserted into the outer member 2 with the outer rim 51 being received as a loose fit in an axial extension 14 at top 11 of the cartridge 1. The cylindrical extension 18 of the outer member 2 is at the same time received in the upper portion of the cylindrical funnel 40 of the inner member 3. The third portion 21 of the cylindrical extension 18 is seated inside the cylindrical funnel 40 with the closed lower face 31 of the cylindrical extension 18 bearing against the support webs 49 of the inner member 3. The filter 4 is then placed over the inner member 3 such that the filter material contacts the annular rim 51. An ultrasonic welding process is then used to join the filter 4 to the inner member 3 and at the same time, and in the same process step, the inner member 3 to the outer member 2. The inner member 3 and filter 4 are welded around the outer rim 51. The inner member 3 and outer member 2 are joined by means of weld lines around the outer rim 51 and also the upper edges of the webs 54.

As shown most clearly in FIG. 21, the outer member 2 and inner member 3 when joined together define a void space 130 in the interior 120 below the annular flange 41 and exterior the cylindrical funnel 40 which forms a filtration chamber. The filtration chamber 130 and passages 57 above the annular frame 41 are separated by the filter paper 4.

The filtration chamber 130 contains the one or more beverage ingredients 200. The one or more beverage ingredients are packed into the filtration chamber 130. For a filtered style beverage the ingredient is typically roast and ground coffee or leaf tea. The density of packing of the beverage ingredients in the filtration chamber 130 can be varied as desired. Typically, for a filtered coffee product the filtration chamber of the first embodiment of cartridge contains between 5.0 and 10.2 grams of roast and ground coffee in a filtration bed of thickness of typically 5 to 14 mm. Optionally, the interior 120 may contain one or more bodies, such as spheres, which are freely movable within the interior 120 to aid mixing by inducing turbulence and breaking down deposits of beverage ingredients during discharge of the beverage.

The laminate 5 is then affixed to the outer member 2 by forming a weld 126 around the periphery of the laminate 5 to join the laminate 5 to the lower surface of the outwardly extending flange 35. The weld 126 is extended to seal the laminate 5 against the lower edge of the cylindrical wall 27 of the inlet chamber 26. Further, a weld 125 is formed between the laminate 5 and the lower edge of the outer tube 42 of the cylindrical funnel 40. The laminate 5 forms the lower wall of the filtration chamber 130 and also seals the inlet chamber 26 and cylindrical funnel 40. However, a small gap 123 exists prior to dispensation between the laminate 5 and the lower edge of the discharge spout 43. A variety of welding methods may be used, such as heat and ultrasonic welding, depending on the material characteristics of the laminate 5.

Advantageously, the inner member 3 spans between the outer member 2 and the laminate 5. The inner member 3 is formed from a material of relative rigidity, such as polypropylene. As such, the inner member 3 forms a load-bearing member that acts to keep the laminate 5 and outer member 2 spaced apart when the cartridge 1 is compressed. It is preferred that the cartridge 1 is subjected to a compressive load of between 130 and 280N in use. The compressive force acts to prevent the cartridge failing under internal pressurization and also serves to squeeze the inner member 3 and outer member 2 together. This ensures that the internal dimensions of passageways and apertures in the cartridge 1 are fixed and unable to change during pressurization of the cartridge 1.

Figure 21:
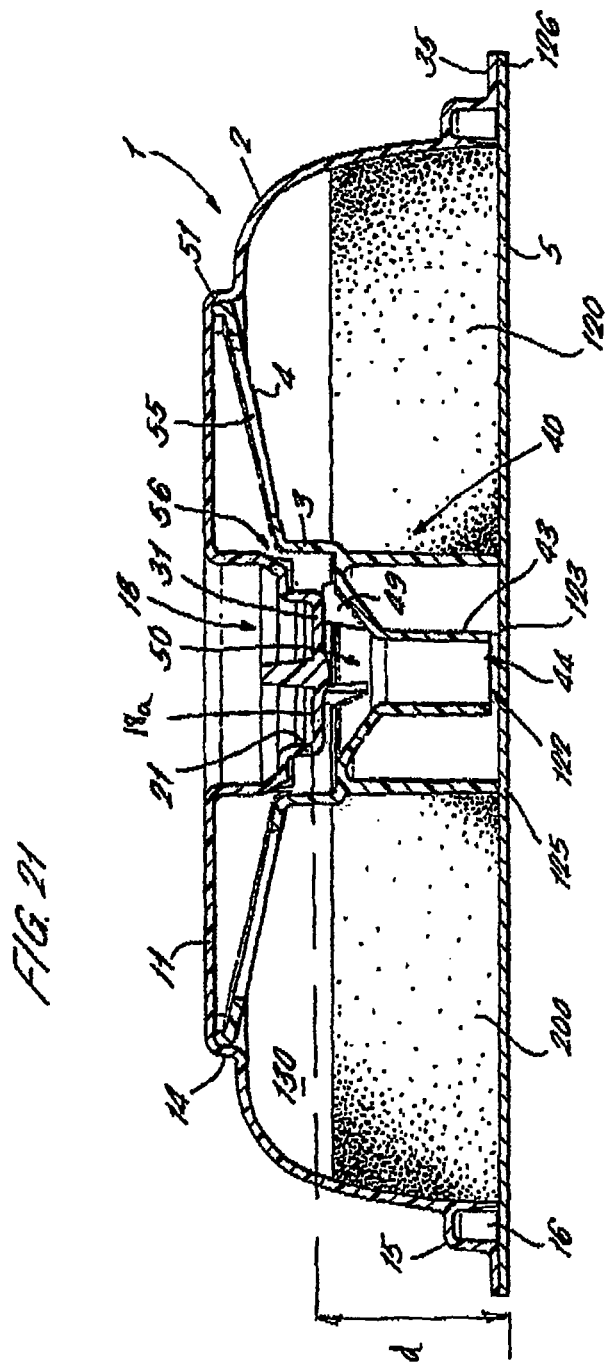
FIG. 21 is a cross-sectional drawing of the first embodiment of cartridge in an assembled condition.

As shown in FIG. 21, the clamping surface 18a at the bottom of the recess in the upper surface of the outer member 2 and the bottom surface of the laminate 5 are separated by a distance d which is fixed by the relative dimensions of the inner member 3 and outer member 2.

To use the cartridge 1 it is first inserted into the beverage preparation machine (as will be described below) and the inlet 121 and outlet 122 are opened by piercing members of the beverage preparation machine which perforate and fold back the laminate 5. An aqueous medium, typically water, under pressure enters the cartridge 1 through the inlet 121 into the inlet chamber 26 at a pressure of between 0.1-2.0 bar. From there the water is directed to flow through the slots 30 and round the manifold 16 and into the filtration chamber 130 of the cartridge 1 through the plurality of slots 17. The water is forced radially inwardly through the filtration chamber 130 and mixes with the beverage ingredients 200 contained therein. The water is at the same time forced upwardly through the beverage ingredients. The beverage formed by passage of the water through the beverage ingredients passes through the filter 4 and filtration apertures 55 into the passages 57 lying above the annular frame 41. The sealing of the filter 4 onto the spokes 53 and the welding of the rim 51 with the outer member 2 ensures that there are no short-circuits and all the beverage has to pass through the filter 4.

The beverage then flows downwardly along the radial passages 57 formed between the webs 54 and through the openings 56 and into the cylindrical funnel 40. The beverage passes along the channels 50 between the support webs 47 and down the discharge spout 43 to the outlet 44 where the beverage is discharged into a receptacle such as a cup.

Preferably, the beverage preparation machine comprises an air purge facility, wherein compressed air is forced through the cartridge 1 at the end of the dispense cycle to flush out the remaining beverage into the receptacle.

Figure 10:
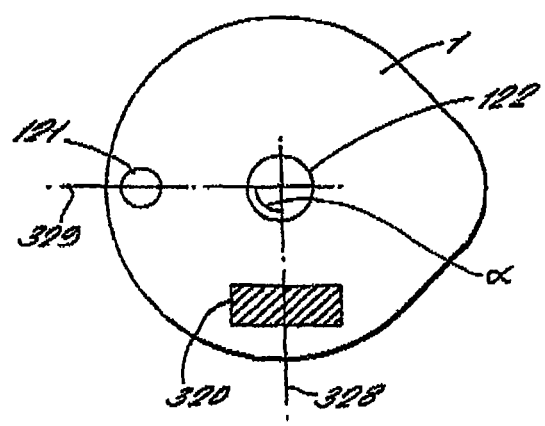
FIG. 10 is a plan view of a beverage cartridge of the present invention.

The cartridge 1 is provided on the laminate with a barcode 320 as shown in FIG. 10. The barcode 320 is formed from a plurality of bars of contrasting color. Preferably the bars are black on a white background to maximize the contrast. The barcode 320 is not required to conform to a published standard but a standard format for barcodes, such as EAN-13, UPC-A, or Interleaf 2 of 5 may be used.

Figure 22:
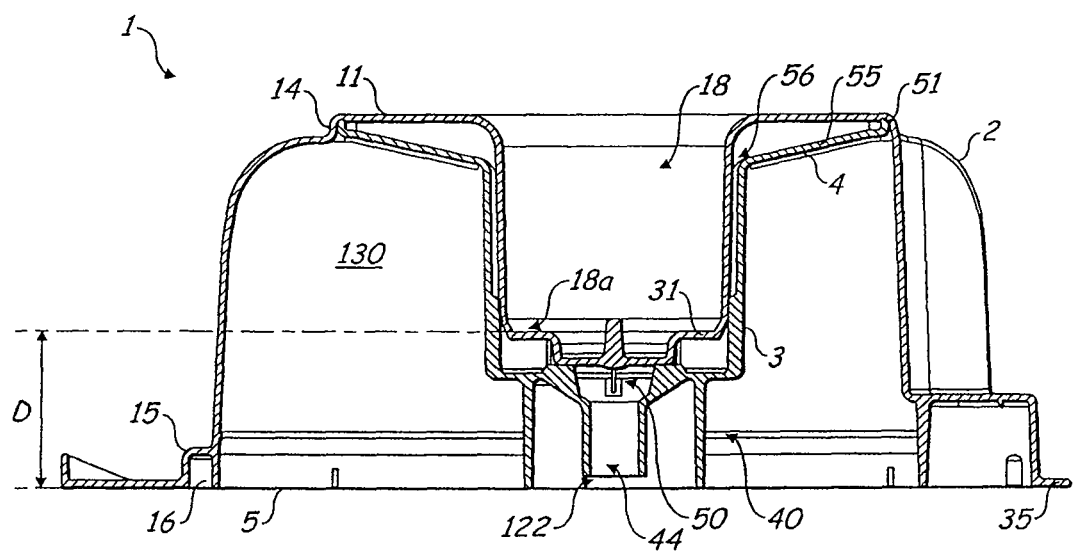
FIG. 22 is a cross-sectional drawing of a second embodiment of cartridge according to the present invention.

FIG. 22 shows a second embodiment of beverage cartridge 1 according to the present invention. Like components between the first and second embodiments have been referenced with like numerals. Many of the components and functions of the second embodiment of cartridge 1 are the same as for the first embodiment. However, it can be seen from FIG. 22 that the cartridge has a greater overall height compared to the cartridge shown in FIG. 21. The outer member 2 is taller and thereby defines a larger void space 130 in which a larger quantity of beverage ingredients can be stored. The second embodiment of cartridge is therefore suitable for dispensing larger volumes of beverage. The diameter of the outer member 2 and cartridge 1 are the same as in the first embodiment. Typically the storage volume of the cartridge 1 when assembled is 50 to 58 ml±20%. As with the first embodiment, the upper surface of the outer member 2 is provided with a recess having a clamping surface 18a located at a bottom thereof. According to the present invention, the separation, d, between surface 18a and the underside of the laminate 5 is the same as for the first embodiment. As a result, the elongated recess extends approximately 60% of the distance towards the laminate 5. This advantageously allows for a simplified clamping arrangement to be used as described below.

The first and second embodiments of cartridge 1 described above are given as examples of the type of cartridge that embody the present invention. Other cartridges of a similar type may be provided, in particular with different inner members 3 which are suitable for dispensing other beverage types, for example foamed milk, espresso-style coffee and chocolate.

Beverage Preparation Machine

As shown in FIG. 1a the housing 210 contains and holds in position the other components of the machine 201. The housing 210 preferably made in whole or in part from a robust plastics material such as ABS. Alternatively, the housing 210 can be made in whole or in part from a metallic material such as stainless steel or aluminum. The housing 210 preferably comprises a clam-shell design having a front half 211 and a rear half 212 which allow access during assembly for fitting of the machine 201 components and can afterwards be joined together to define an interior 213 of the housing 210. The rear half 212 provides a recess 214 for the attachment of the water tank 220. The housing 210 is formed with means, such as detents, abutments, bosses and threaded portions, for retaining the components of the machine 201 in position without the need for a separate chassis. This reduces the overall cost and weight of the machine 201. A base 215 of the housing 210 is preferably provided with feet for standing the machine thereon in a stable manner. Alternatively, the base 215 itself may have a shape forming a stable support.

The front half 211 of the housing 210 comprises a dispense station 270 where dispensation of the beverage takes place. The dispense station 270 comprises a receptacle stand 271 having a hollow interior forming a drip tray 272. An upper surface 273 of the receptacle stand is provided with a grill 274 on which the receptacle is positioned. The drip tray 272 is removable from the housing 210 to ease emptying of the collected water. A recess 275 is formed in the front half of the housing 210 above the receptacle stand 271 to accommodate the dimensions of the receptacle.

The brew head 250 is located towards the top of the housing 210 above the receptacle stand as shown in FIGS. 1a and 1b. Preferably, the height of the grill 274 relative to the brew head 250 can be adjusted to accommodate different sizes of receptacle. It is, preferred that the receptacle is as close to the brew head 250 as possible, whilst still allowing the receptacle to be inserted and withdrawn from the dispense station 270, so as to minimize the height that the dispensed beverage has to descend before contacting the receptacle. This acts to minimize spraying and splashing of the beverage and minimize loss of entrained air bubbles Where these are present. Preferably receptacles of between 70 mm and 110 mm in height can be inserted between the grill 274 and brew head 250.

The machine user interface 240 is located on the front of the housing 210 and comprises a start/stop button 241, and a plurality of status indicators 243-246.

The status indicators 243-246 preferably include a light emitting diode (LED) 243 to indicate readiness of the machine 201, a LED 244 to indicate if an error has occurred in the machine 201 operation, and one or more LEDs 245-255 to indicate whether the machine 201 is operating in manual or automatic modes. The LEDs 243-246 may be controlled to illuminate at a constant intensity, to flash intermittently, or both depending on the status of the machine 201. The LEDs 243-246 may have a variety of colors including green, red and yellow.

The start/stop button 241 controls commencement of the dispense cycle and is a manually operated push-button, switch or similar.

A volume adjustment control may be provided to allow a user of the machine 201 to manually adjust the volume of the delivered beverage without altering the other operating characteristics. Preferably the volume adjustment control allows an adjustment in volume of plus or minus 20%. The volume adjustment control may be a rotary knob, a linear slider, a digital readout with increment and decrement buttons, or similar. More typically, volume is controlled by a user operating the start/stop button 241.

A manual power switch not shown) may be provided on the machine 201. Alternatively, power supply can be controlled simply by insertion or removal or the power supply plug from the mains power supply.

The water tank 220 is located to the rear of the housing 210 and is connected to the rear half 212 of the housing 210. The water tank 220 comprises a generally cylindrical body 221 which may be right circular or a frustum as desired for aesthetic reasons. The tank comprises an inlet for filling the tank with water which is closed off in use by a manually removable lid 222. An outlet is provided towards a lower end of the tank which communicates with the water pump 230. The water tank 220 may be made from a transparent or translucent material to allow a consumer to view the quantity of water remaining in the tank. Alternatively, the water tank 220 may be made from an opaque material but have provided a viewing window therein. In addition, or in place of the above, the water tank 220 may be provided with a low level sensor which prevents operation of the water pump 230 and optionally triggers a warning indicator, such as an LED, when the water level in the tank descends to a preselected level. The water tank 220 preferably has an internal capacity of approximately 1.5 liters.

The water pump 230 is operatively connected between the water tank 220 and the water heater 225 as shown schematically in FIG. 8 and is controlled by the control processor. The pump provides a maximum flow rate of 900 ml/min of water at a maximum pressure of 2.5 bar. Preferably, in normal use, the pressure will be limited to 2 bar. The flow rate of water through the machine 201 can be controlled by the control processor to be a percentage of the maximum flow rate of the pump by cycle chopping the electrical supply to the pump. Preferably the pump can be driven at any of 10%, 20%, 30%, 40%, 50%, 60%, 70%, 80%, 90% or 100% of the maximum rated flow rate. The accuracy of the volume of water pumped is preferably + or −5% leading to a + or −5% accuracy in the final volume of the dispensed beverage. A suitable pump is the Evolution® EP8 pump produced by Ulka S.r.l. (Pavia, Italy). A volumetric flow senior (not shown) is preferably provided in the flow line either upstream or downstream of the water pump 230. Preferably, the volumetric flow sensor is a rotary sensor.

The water heater 225 is located in the interior of the housing 210. The heater 225 has a power rating of 1550 W and is able to heat water received from the water pump 230 from a starting temperature of approximately 20° C. to an operating temperature of around 85° C. in under 1 minute. Preferably the dwell time between the end of one dispense cycle and the heater 225 being able to commence a subsequent dispense cycle is less than 10 seconds. The heater maintains the selected temperature to within + or −2° C. during the dispense cycle. The water for the dispense cycle may be delivered to the brew head 250 at 83° C. or 93° C. The heater 225 is able to quickly adjust the delivery temperature to either 83° C. or 93° C. from a nominal water temperature of 85° C. The heater 225 comprises an over-temperature cut-off which shuts off the heater if the temperature exceeds 98° C. Water output from the heater 225 is fed to the brew head 250 by means of a three-way valve. If the pressure of the water flow is acceptable the water is passed to the cartridge 1. If the pressure is below or above predetermined limits then the water is diverted by means of the three-way valve into the drip tray recovery receptacle 270.

The air compressor 235 is operatively connected to the brew head 250 by means of a one-way valve and controlled by the control processor. The air compressor 235 provides a maximum flow rate of air of 500 ml/min at 1.0 bar. In use a working volume of 35 ml is pressurized to 2.0 bar. Preferably, the air compressor 235 can produce two flow rates: a fast (or maximum) flow rate and a slow flow rate.

The control processor of the beverage preparation machine 201 comprises a processing module and a memory. The control processor is operatively connected to, and controls operation of, the water heater 225, water pump 230, air compressor 235 and user interface 240.

The memory of the control processor includes one or more variables for one or more operational parameters for the beverage preparation machine 201. The operational parameters are the temperature of the water passed through the beverage cartridge 1 during the operating stage, the speed of charging the beverage cartridge 1, the presence or otherwise of a soak step, the total dispensed volume of the beverage, the flow rate of the water during the discharge stage, and the flow rate and period of the purge stage.

The variables for the operational parameters are stored in the memory. The cartridge 1 comprises a code provided on or in the cartridge 1 representing the operational parameters required for optimal dispensation of the beverage in that cartridge 1. The code is in binary format and comprises a plurality of data bits corresponding to the variables stored in the control processor memory.

The brew head 250 is shown in FIGS. 4 to 7. The holder 251 of the brew head 250 comprises a fixed lower part 255, a rotatable upper part 256 and a pivotable cartridge mount 257 positioned inbetween the fixed lower part 255 and the rotatable upper part 256. The upper part 256, lower part 255 and cartridge mount 257 are rotated about a common hinge axis 258. FIGS. 4 to 7 show the holder 251 with some components of the machine 201 omitted for clarity.

The rotatable upper part 256 and pivotable cartridge mount 257 are moved relative to the fixed lower part 255 by means of a clamping mechanism 280. The clamping mechanism 280 comprises a clamping lever having first and second members or parts 281 and 282. The first part 281 of the clamping lever comprises a U-shaped arm which is pivotably mounted to the upper part 256 at two first pivot points 283, one on each side of the holder 251.

The second part of the clamping lever comprises two over-centre arms 282, one on each side of the holder 251 which are each pivotably mounted to the upper part 256 at a second pivot point 285 located on the hinge axis 258 coupling the upper part 256 to the fixed lower part 255. Each over-centre arm 282 is a reciprocal member comprising a cylinder 282*a*, a stem 282*b* and a resilient sleeve 292*c*. The cylinder 282*a* has an internal bore and is rotatably mounted at one end at the hinge axis 258. A first end of the stem 282*b* is slidingly received in the bore of the cylinder 282*a*. The opposite end of the stem 282b is rotatably mounted to the U-shaped arm 281 at a third pivot point 286. The third pivot points 286 are unconnected to; and freely moveable relative to, the upper part 256 and lower part 255. The resilient sleeve 282c is mounted externally on the stem 282b and extends, in use, between abutment surfaces on the cylinder 282a and stem 282b. The resilient sleeve 282c accommodates shortening of the over-centre arm 282 but biases the over-centre arm 282 into an extended configuration. Movement of the third pivot points 286 towards and away from the hinge axis 258 is thus possible by relative movement of the stems 282b in the cylinders 282a. The resilient sleeves 282c are preferably formed from silicone. Whilst the illustrated embodiment uses two over-centre arms 282, it will be apparent that the closure mechanism my be configured with only one over-centre arm 282.

The U-shaped arm 281 extends around the front of the holder 251 and comprises two downwardly dependant hook members 287, one on each side of the holder 251, each comprising a cam surface 288 facing the hinge axis 259. The fixed lower part 255 of the holder 251 is provided with two bosses 259, or detents, located one on each side of the lower part 255 at or near a front edge 260 thereof aligned generally with the hook members 287.

As shown in FIG. 4, the U-shaped arm 281 may be formed from a one piece plastics molding comprising an ergonomic hand grip and the hook members 287 integral to the arm.

Figure 7:
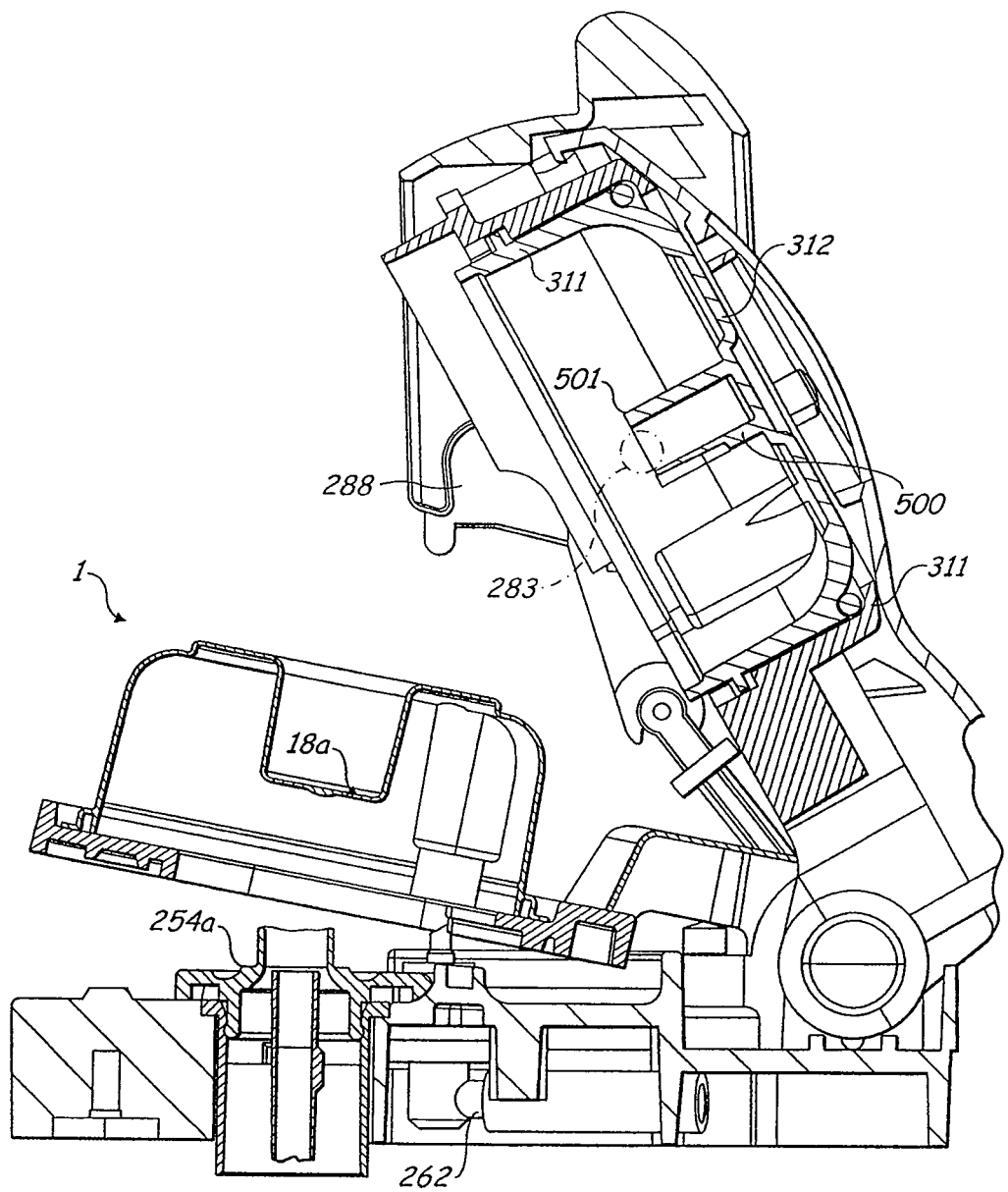
FIG. 7 is a cross-sectional view of the brew head in an open position illustrated containing the second embodiment of cartridge of the present invention.

The cartridge mount 257 is rotatably mounted between the upper and lower parts 255, 256 of the holder 251. The mount 257 is provided with a substantially circular recess 290 which receives in use the beverage cartridge 1. The recess 290 includes an irregularity 291 for accommodating the handle portion 24 of the beverage cartridge 1 which also acts to prevent rotation of the beverage cartridge 1 in the holder 251. The cartridge mount 257 is sprung relative to the fixed lower part 255 such that in the open position, as shown in FIG. 7, the cartridge mount 257 is biased out of contact with the fixed lower part 255 so that the cartridge mount 257 is moved out of contact with the outlet and inlet piercer members 254, 253. The cartridge mount 257 is provided with an aperture 292 for receiving therethrough the inlet and outlet piercers 253, 254 and a head 300 of the cartridge recognition means 252 when the cartridge mount 257 is moved into the closed position.

Figure 6:
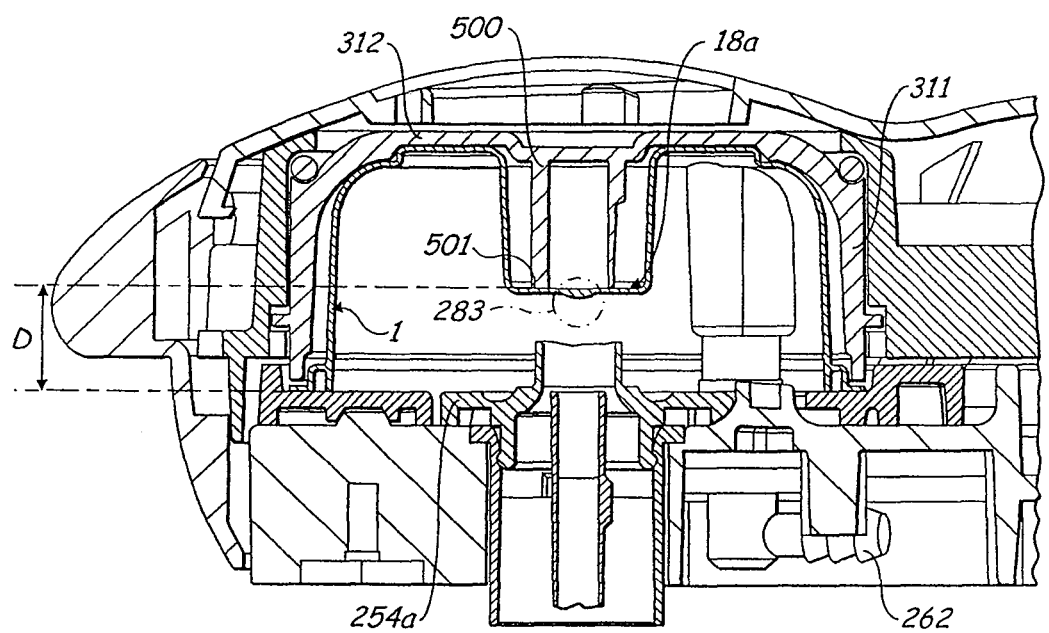
FIG. 6 is a cross-sectional view of the brew head in a closed position accommodating a second embodiment of beverage cartridge according to the present invention.

The upper part 255 comprises a generally circular body 316 housing a circular viewing window 312 through which a consumer can view the beverage cartridge 1 during a dispense cycle and also visually confirm whether a cartridge 1 is loaded in the machine 201. The viewing window 312 is cup-shaped having a downwardly directed rim 311. In addition, according to the present invention, the viewing window 312 is provided with a clamping member in the form of an inwardly directed tubular extension 500 as shown in FIG. 7. The extension 500 is directed towards the lower part 256 and lies within the volume of the brew head when in the closed position as shown in FIG. 6. The viewing window 312 is able to move axially relative to the body 310 of the upper part 255. One arrangement of accomplishing the relative movement is to provide a wave spring (not shown), or similar resilient means such as a rubberized ring, positioned between the viewing window 312 and the circular body 310. In an alternative arrangement, a series of helical compression springs (not shown) are provided extending between the viewing window 312 and the body 310. In both cases the resilient means allows the viewing window 312 to move axially relative to the circular body 310 by a small degree.

When the holder 251 is in the closed position, a distal end 501 of the tubular extension 500 of viewing window 312 bears against the clamping surface 18a of the beverage cartridge 1 biasing it against the lower part 256 as shown in FIG. 6 (in which the arrangement is illustrated containing a cartridge according to the second embodiment previously described). The pressure exerted by the tubular extension 500 on the outer member 2 ensures a fluid tight seal between the cartridge 1 and the holder 251. It should be noted that the height of the viewing window 312 and hence also the brew head is such that cartridges of various heights can be inserted. In FIG. 6 the arrangement is shown with the relative tall cartridge of the second embodiment described above. The same brew head can also accommodate the shorter cartridge of the first embodiment. In this case there will be a gap between the upper surface 11 of the cartridge 1 and the window 312. However the cartridge 1 is fully sealed at inlet and outlet by the pressure applied by the tubular extension 500.

The lower part 255 comprises the inlet and outlet piercers 253, 254 and the head 300 of the cartridge recognition means 252. The inlet piercer 253 comprises a hollow needle-like tube 260 having a sharpened end 261 for perforating the laminate 5 of the beverage cartridge 1 in use. The inlet piercer 253 is in fluid communication with a water conduit 262 as shown in FIG. 7 which passes through the lower part 255 and is connected to an outlet conduit 263 of the water heater 225. The outlet piercer 254 is similar in type to the outlet piercer described in the applicant's European patents EP 0 389 141 and EP 0 334 572 and comprises an open ended cylinder 264 of circular or D-shaped cross-section having dimensions larger than the discharge spout 43. An arcuate portion 265 of the upper end of the outlet piercer 254 is serrated to pierce and eventually cut the laminate of the beverage cartridge 1. The remainder of the upper end is cut back longitudinally of the cylinder at least to the base of the teeth 266 of the serrated portion to fold or pull the cut laminate 5 away from the outlet aperture before the beverage is dispensed therethrough. The outlet piercer 254 pierces the laminate 5 externally of the discharge spout 43 and when the cartridge mount 257 is in the closed position, rests in the annulus between the discharge spout 43 and the outer wall 42 of the discharge funnel 40. The outlet piercer 254 folds back the cut laminate 105 into the annulus. Thereby both the outlet piercer 254 and the cut laminate 105 are held out of the way of the discharged beverage.

The outlet piercer 254 is surrounded by a ledge 254a which is raised relative to its surroundings by 0.5 mm.

Advantageously, the outlet piercer 254 is removable from the lower part 255 to enable it to be thoroughly cleaned, for example, in a dishwasher. The removable outlet piercer 254 is received in a recess 267 in the lower part 255 where it is seated. The inlet piercer 253 and/or the outlet piercer 254 may be made of a metal, such as stainless steel, or from a plastics material. Advantageously, the use of plastic cutting elements is enabled by use of a laminate 5 which is able to be punctured and cut by a non-metallic material. Consequently, the piercers 253, 254 can be made less sharp which lowers the risk of injury to the consumer. In addition, plastic piercing elements are not prone to rust. Preferably, the inlet piercer 253 and the outlet piercer 24 are formed as a single, integral unit which is removable from the lower part 255.

In use, the upper part 256 of the holder 251 is movable from an open position in which it is orientated vertically or towards the vertical as shown in FIG. 1b, to a closed position in which it is orientated substantially horizontally and in interengagement with the fixed lower part 255 and cartridge mount 257. The upper part 256 is moved from the open to the closed positions by operation of the clamping lever. To close the upper part 256 a user takes hold of the clamping lever by the U-shaped arm 281 and pulls downwards. Consequently, the upper part 256 rotates which first brings the tubular extension 500 of the viewing window 312 into contact with the clamping surface 18a of the beverage cartridge 1. Continued rotation of the upper part 256 rotates the upper part 256 and cartridge mount 257 down into contact with the lower part 255. Further rotation of the U-shaped arm 281 causes the U-shaped arm 281 to rotate relative to the upper part 256 and the lower part 255 resulting in the hook members 287 of the upper part 256 engaging the bosses 259 of the lower part 255 with the cam surface 288 riding over the bosses 259. During this last stage of rotation the cartridge 1 is compressed between the cartridge mount 257 and the viewing window 312. As a result, the viewing window 312 is moved axially slightly relative to the circular body 310 of the upper part 256 against the bias of the wave spring or helical springs. This movement allows for a take up of tolerances in the beverage cartridge 1 and beverage preparation machine and ensures that the amount of compressive force applied to the cartridge is kept within an acceptable range. The clamping force of the mechanism as moderated by the action of the wave spring or helical springs ensures a clamping pressure on the cartridge. It has been found that a pressure of between 50 N and 280 N is required. It will be noted that a lower pressure level is possible with this arrangement without a deleterious effect on the sealing of the cartridge 1. During closure of the brew head the laminate 5 of the cartridge 1 is tensioned as it is brought into contact with the ledge 254a surrounding the outlet piercer 254 which causes the laminate 5 to flex out of plane as the distal end of the outer tube 42 of the cylindrical funnel is moved upwardly by 0.5 mm relative to the flange 35. This movement also ensures that the great majority of the compressive force applied to the cartridge acts through the central region of the cartridge 1 through the load-bearing inner member 3. These clamping forces help prevent failure of the cartridge 1 during pressurization and also ensure that the inner member 3 and outer member 2 are fully seated relative to one another and thus that all internal passageways and apertures remain at their intended dimensions even during internal pressurization.

In the closed position, the separation of the distal end 501 of the tubular extension 500 and the lower part 256 is shown by reference D in FIG. 6. This distance is fixed by the dimensions of the viewing window 312, body 310 and lower part 256. The distance D is chosen to be the same or marginally smaller than the distance d between the clamping surface 18a and laminate under surface of the cartridges 1. In this way, on closure of the brew head the cartridges 1 are subjected to a fixed, known degree of compression. In addition, both the first and second embodiments of cartridge can be clamped with the same degree of compression since distance d is the same for both cartridge types.

An imaginary datum line can be drawn between the first and second pivot points 283, 285 of the holder 251. As can be seen in FIG. 7, in the open position the third pivot points 286 are located on the side of the datum line nearest the fixed lower part 255. As the upper part 256 reaches the closed position, the third pivot points 286 of the clamping lever pass through the datum line joining the first and second pivot points 283, 285 to the opposite side of the line, furthest from the fixed lower part 255. Consequently, the U-shaped arm 281 'snaps through' from a first stable position to a second stable position. The snap through action is accommodated by shortening of the over-centre arms 282 and consequential compression of the resilient sleeves 282c. Once the third pivot points 286 are past the imaginary datum line there recovery of the resilient sleeves 282c acts to continue the motion of the third pivot points 286 away from the imaginary datum line. The clamping lever thus has a bi-stable operation in that the lever is stable in the open or closed positions but unstable at the point when the third pivot points 286 lie on the imaginary datum line joining the first and second pivot points 283, 285. Thus, the snap-through action of the clamping lever provides a positive closure mechanism which leads to a definite closure action wherein in the final stages of the clamping lever's rotation, the snap-through action of the U-shaped arm 281 and second arms 284 forces the hook members 287 firmly into engagement with the bosses 259. In addition, the resilient sleeves 282c provide a resistance to re-opening of the upper part 256 since a minimum force is required to compress the sleeves 282c sufficiently to move the third pivot points 286 back into line with the datum line joining the first and second pivot points 283, 285. Advantageously, the interengagement of the hook members 267 and the bosses 259 prevents separation of the upper and lower parts other than by rotation of the clamping lever. This is useful in preventing opening of the brew head 250 during operation when the brew head 250 is subject to, internal pressurization.

Figure 9A:
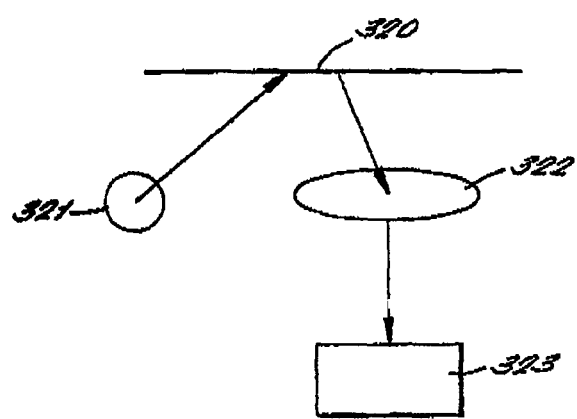
Figure 9B:
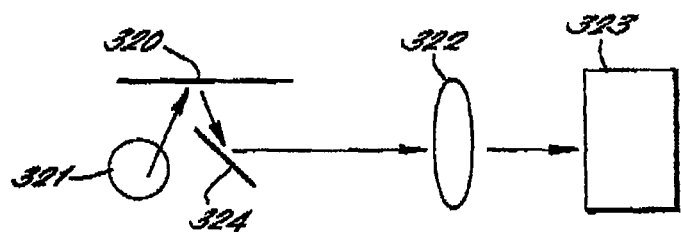

The purpose of the recognition means 252 is to allow the machine 201 to recognize the type of beverage cartridge 1 that has been inserted and to adjust one or more operational parameters accordingly. In a typical embodiment, the recognition means 252 comprises an optical barcode reader which reads the printed barcode 320 provided on the laminate 5 of the beverage cartridge 1 as shown in FIG. 10 and discussed above. The optical barcode reader comprises one or more LEDs 321 to illuminate the barcode 320, a focusing lens 322 to acquire an image of the barcode, a charge coupled device (CCD) 323 for producing an electrical signal representative of the acquired image and support circuitry for the LEDs and CCD. The space in the lower part for accommodating the barcode reader is limited. A mirror or mirrors 324 may be used to reflect the light from the LEDs 321 to a focussing lens which is not located in the lower part 255. Schematic arrangements are shown in FIGS. 9a and 9b. The lower part 255 comprises an aperture 326 which is the same size as the barcode 320 on the beverage cartridge 1. The aperture 326 is closed by a window, preferably glass, which can transmit the signals produced by the barcode reader. In use the electrical signals produced are decoded by signal processing software and the results forwarded to the control processor. The software can recognize whether the read of the barcode contained errors, although the occurrence of these is minimized as described above by specific location of the barcode 320 relative to the inlet. The barcode 320 may be rescanned a number of times before an error message is presented to the consumer. If the machine 201 is unable to read the barcode the consumer is able to use the beverage cartridge 1 to dispense a beverage using a manual mode of operation. Alternatively, an RFID reader is provided to read an RFID located on the cartridge 1.

The brew head 250 may also include a cartridge sensor for detecting whether a cartridge is present in the holder 251.

The brew head 250 may also include a lock sensor which detects whether the holder 251 is properly closed. Preferably the lock sensor comprises a micro-switch which is triggered when the holder 251 is closed and locked. Preferably the cartridge sensor and lock sensor are connected in series such that the output of both sensors must be satisfactory, i.e.

cartridge present and mechanism looked, before the dispense cycle can be commenced.

Operation of the machine 201 comprises insertion of a beverage cartridge 1 into the brew head 250, carrying out a dispense cycle in which the beverage is dispensed and removal of the cartridge 1 from the machine.

The operational behavior of the machine 201 is determined by software embedded in the control processor.

To insert the cartridge 1 the holder 251 is opened as described above to expose the cartridge mount 257. The cartridge 1 is then placed on the cartridge mount 257 received within the recess 290 such that the handle 24 of the cartridge is located in the irregularity 291. The optical or magnetic barcode 320 or RFID of the cartridge 1 is orientated directly above the aperture 326 in the cartridge mount 257. The holder 251 is then closed by operation of the clamping lever as described above. During closure the inlet and outlet piercers 253, 254 pierce the laminate 5 of the cartridge 1 to form the cartridge inlet 121 and outlet 122. As described above the laminate 5 cut by the outlet piercer 254 is folded up into the annulus surrounding the discharge spout 43. When closed the holder 251 grips the cartridge 1 around the rim 35 between the cartridge mount 257 and the upper part 256 and/or between the window 311 and the top 11 of the cartridge 1 to form a fluid tight seal of sufficient integrity to withstand the pressures developed during the dispense cycle.

To commence the operating cycle the consumer operates the start/stop button 241.

The operating cycle comprises the steps of cartridge recognition and the discharge cycle.

Cartridge recognition is performed by the optical recognition means 252 as described above assuming that the outputs from the cartridge sensor and lock sensor are satisfactory. Once the barcode 320 or RFID has been decoded the operational parameters of the machine 201 are adjusted by the control processor. The discharge cycle is then automatically commenced.

The discharge cycle has four main stages, not all of which are used for all beverage types:
  (i) Pre-wet
  (ii) Pause
  (iii) Brew/Mixing
  (iv) Purge In the pre-wet stage the cartridge 1 is charged with water from the water storage tank 220 by means of the water pump 230. The charging with water causes the beverage ingredients 200 in the filtration chamber 130 to be wetted. The charging may take place at a "fast" flow rate of 600 ml/min or a "slow" flow rate of 325 ml/min. The slow charging rate is particularly useful for cartridges containing viscous liquid beverage ingredients where the ingredients require some dilution before they are able to be pumped at a higher volume flow rate. The volume of water injected into the cartridge 1 is selected to ensure that water or beverage does not drip out of the cartridge outlet 122 during this stage.

The pause stage allows the beverage ingredients 200 to soak in the water injected during the pre-wet stage for a predetermined period of time. Both the pre-wetting and soaking stages are known to increase the yield of the extractibles from the beverage ingredients 200 and to improve the end flavor of the beverage. Pre-wetting and soaking are particularly used where the beverage ingredients are roast and ground coffee.

In the brew/mixing stage water is passed through the cartridge 1 in order to produce the beverage from the beverage ingredients 200. The temperature of the water is determined by the control processor which sends instructions to the water heater 225 to heat the water passing from the water tank 220 to the brew head 250. Water enters the lower part 255 of the holder 251 through the conduit 262 via the inlet valve and the inlet piercer 253 into the inlet chamber 126 of the beverage cartridge 1. Brewing and/or mixing and subsequent dispensing of the beverage from the beverage cartridge 1 is as described above with reference to the versions of the beverage cartridge 1.

The air purge comprises the blowing of pressurized air through the beverage preparation machine and the beverage cartridge 1 to ensure that all beverage is dispensed and that the flow path is cleared ready for dispensing another beverage. The air purge does not commence immediately on cessation of the brew/mixing stage to allow for the majority of the fluid to clear the flow path. This prevents an unacceptable spike in internal pressure on commencement of the air purge.

In normal operation a user manually stops the machine 201 by operating the start/stop button 241.

Once the operating cycle has been completed the consumer removes the cartridge 1 by opening the holder 251 and manually removing and disposing of the cartridge. Alternatively, the machine 201 may be provided with an automatic ejection mechanism for removing the cartridge automatically on opening the holder 251.

The invention claimed is:

1. A method of dispensing a single serving of a beverage comprising the steps of:
  providing a first beverage cartridge containing one or more beverage ingredients suitable for brewing in a storage volume;
  passing an aqueous medium through the one or more beverage ingredients of the first beverage cartridge to thereby form a filtered beverage;
  dispensing said filtered beverage from the cartridge into a receptacle;
  providing a second beverage cartridge containing one or more foamable beverage ingredients in a storage volume;
  passing an aqueous medium through the one or more beverage ingredients of the second beverage cartridge to thereby form a foamed beverage portion;
  dispensing said foamed beverage portion from the cartridge into the receptacle to thereby form a cappuccino-style beverage;
  wherein the storage volume of the first beverage cartridge is between 40 and 60 ml;
  wherein the volume of the dispensed filtered beverage is greater than 400 ml;
  wherein the storage volume of the second beverage cartridge is between 40 and 60 ml;
  wherein the volume of the dispensed foamed beverage portion is greater than 200 ml; and
  wherein at least one of the storage volume and height of the second beverage cartridge is different from that of the first beverage cartridge;
  wherein the step of providing a first beverage cartridge containing beverage ingredients comprises clamping the first beverage cartridge into a brew head of a beverage preparation machine, wherein the step of providing a second beverage cartridge further comprises clamping the second beverage cartridge into the brew head after removing the beverage cartridge containing beverage ingredients, and wherein the brew head is configured to accommodate beverage cartridges that vary in height or storage volume, wherein the brew head comprises a first part and a second part, the first and second parts being movable relative to one another between open and closed positions, and wherein the first part supports a resting surface of the beverage cartridge, and the second part presses against a clamping surface of the beverage cartridge in the closed position, and wherein the first and second parts of the brew head are separated by a distance in the closed position that remains constant when each of the first and second beverage cartridges are clamped.

2. A method as claimed in claim 1 wherein the volume of the dispensed filtered beverage is greater than 600 ml.

3. A method as claimed in claim 2 wherein the volume of the dispensed filtered beverage is greater than 700 ml.

4. A method as claimed in claim 1 wherein the beverage ingredient suitable for brewing is roast and ground coffee, instant coffee, instant tea or leaf tea.

5. A method as claimed in claim 1 wherein the volume of the dispensed foamed beverage portion is greater than 300 ml.

6. A method as claimed in claim 1 wherein the foamable beverage ingredient comprises a liquid milk or milk-based product or chocolate-based product.

7. A method as claimed in claim 1, wherein both of the storage volume and the height of the second beverage cartridge are different from that of the first beverage cartridge.

8. A method as claimed in claim 1, wherein the first part comprises a clamping member, the clamping member being located at or near a center of the first part so as to clamp the beverage cartridge at or near a center thereof.

9. A method as claimed in claim 1, wherein a resting surface and a clamping surface of the first beverage cartridge are separated by a distance that is the same as a distance that separates a resting surface and a clamping surface of the second beverage cartridge.

10. A method of dispensing a single serving of a beverage comprising: clamping a first beverage cartridge into a brew head of a beverage preparation machine, the first beverage cartridge containing one or more beverage ingredients suitable for brewing, the first beverage cartridge having a height and a storage volume;

passing an aqueous medium through the one or more beverage ingredients of the first beverage cartridge to form a filtered beverage component;

dispensing the filtered beverage component into a receptacle;

clamping a second beverage cartridge into the brew head, the second beverage cartridge containing one or more beverage ingredients suitable to form a foaming beverage component, the second beverage cartridge having a height and a storage volume;

passing an aqueous medium through the one or more beverage ingredients of the second beverage cartridge to form a foamed beverage component; and dispensing the foamed beverage component from the cartridge into the receptacle, wherein at least one of the height and the storage volume of the first beverage cartridge is different from that of the second beverage cartridge; and wherein clamping the first and second beverage cartridges includes placing a resting surface of the beverage cartridge on a first part of the brew head and moving a second part of the brew head into a closed position, wherein the second part of the brew head presses against a clamping surface of the beverage cartridge in the closed position, and wherein the first and second parts of the brew head are separated by a distance in the closed position that remains constant when each of the first and second beverage cartridges are clamped.

11. The method of claim 10, wherein the storage volume of the first beverage cartridge is between 40 and 60 ml, the volume of the dispensed filtered beverage is greater than 400 ml, the storage volume of the second beverage cartridge is between 40 and 60 ml, and the volume of the dispensed foamed beverage portion is greater than 200 ml.

12. The method of claim 10, wherein a separation between the resting surface and clamping surface for the first beverage cartridge is the same as that for the second beverage cartridge.

13. The method of claim 12, wherein the clamping surface of the first and second beverage cartridges is positioned in a recess on a surface opposite the resting surface.

14. The method of claim 10, wherein both of the storage volume and the height of the second beverage cartridge are different from that of the first beverage cartridge.

15. The method of claim 10, the first part of the brew head comprises a clamping member, the clamping member being located at or near a center of the first part so as to clamp the beverage cartridge at or near a center thereof.

16. The method of claim 10, wherein a resting surface and a clamping surface of the first beverage cartridge are separated by a distance that is the same as a distance that separates a resting surface and a clamping surface of the second beverage cartridge.

* * * * *